(12) United States Patent
Servida

(10) Patent No.: US 10,155,680 B2
(45) Date of Patent: Dec. 18, 2018

(54) APPARATUS FOR TREATING A FLUID

(71) Applicant: IDROPAN DELL'ORTO DEPURATORI S.R.L., Milan (IT)

(72) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 283 days.

(21) Appl. No.: 15/026,991

(22) PCT Filed: Oct. 9, 2014

(86) PCT No.: PCT/IB2014/002075
§ 371 (c)(1),
(2) Date: Apr. 4, 2016

(87) PCT Pub. No.: WO2015/052574
PCT Pub. Date: Apr. 16, 2015

(65) Prior Publication Data
US 2016/0229717 A1 Aug. 11, 2016

(30) Foreign Application Priority Data

Oct. 9, 2013 (IT) .............................. PD2013A0280

(51) Int. Cl.
*C02F 1/469* (2006.01)
*C25B 9/20* (2006.01)
(Continued)

(52) U.S. Cl.
CPC .......... *C02F 1/4691* (2013.01); *C02F 1/4604* (2013.01); *C02F 1/4695* (2013.01);
(Continued)

(58) Field of Classification Search
CPC .................................. C25B 9/20; C25B 9/203
See application file for complete search history.

(56) References Cited

U.S. PATENT DOCUMENTS 1,448,037 A * 3/1923 Pechkranz ................ C25B 9/20
204/256
2,143,793 A * 1/1939 Niederreither ............ C25B 9/20
204/254
(Continued)

FOREIGN PATENT DOCUMENTS

EP 0066938 A2 12/1982
EP 2098485 A2 9/2009

*Primary Examiner* — Harry D Wilkins, III
(74) *Attorney, Agent, or Firm* — Mark M. Friedman

(57) ABSTRACT

Apparatus for treating a fluid, which comprises a plurality of superimposed cells that are assembled and compressed together to form a stack by fixing means. Each cell comprises at least one chamber delimited by two facing containment layers and provided with an inlet opening and with an outlet opening for the passage of a fluid to be treated. Each chamber perimetrically arranges first sealing means for sealing it with fluid seal and houses at least one electrode layer for treating the fluid. According to the invention, each chamber comprise at least two support layers, e.g. rigid, made of plastic material, each of which being mechanically fixed to one of the two containment layers advantageously formed by the same electrode layers. Hence, first spacer means are provided, interposed between the two support layers of each cell in order to separate, by a first compression end stop distance, the two containment layers of the chamber and prevent excessive compressions of the layers of the cell while ensuring optimal hydraulic seal; and second spacer means are provided, interposed between the support layers of pairs of contiguous cells in order to separate them at a second compression end stop distance aimed to ensure the hydraulic connection between the cells without subjecting the same cells to an excessive compression which varies the internal size thereof in an imprecise manner.

17 Claims, 21 Drawing Sheets

(51) Int. Cl.
*C02F 1/46* (2006.01)
*C02F 103/08* (2006.01)

(52) U.S. Cl.
CPC ............ *C25B 9/20* (2013.01); *C02F 2103/08* (2013.01); *C02F 2201/4611* (2013.01); *C02F 2201/4616* (2013.01); *C02F 2201/46115* (2013.01)

(56) References Cited

U.S. PATENT DOCUMENTS

| | | | | |
|---|---|---|---|---|
| 3,062,734 A * | 11/1962 | Carus | ................ | C01G 45/1214 204/235 |
| 4,107,023 A * | 8/1978 | Mentz | .................... | C25B 1/265 204/267 |
| 4,175,025 A * | 11/1979 | Creamer | .................... | C25B 9/20 204/253 |
| 4,204,939 A * | 5/1980 | Boulton | .................... | C25B 9/20 204/258 |
| 4,206,029 A * | 6/1980 | Spirig | ........................ | C25B 1/06 204/228.1 |
| 4,252,628 A * | 2/1981 | Boulton | .................... | C25B 9/20 204/257 |
| 4,305,806 A * | 12/1981 | Holca | .................... | C25B 9/203 204/268 |
| 4,402,810 A * | 9/1983 | Boulton | .................... | C25B 9/20 204/255 |
| 4,495,048 A * | 1/1985 | Murakami | .............. | C25B 9/203 204/267 |
| 4,589,968 A * | 5/1986 | Toomey, Jr. | ........ | H01M 8/2465 204/257 |
| 4,671,863 A * | 6/1987 | Tejeda | .................... | B01D 61/46 204/266 |
| 5,421,977 A * | 6/1995 | Getsy | ........................ | C25B 9/20 204/252 |
| 5,425,858 A * | 6/1995 | Farmer | .................... | B01J 47/08 204/164 |
| 5,620,597 A | 4/1997 | Andelman | | |
| 5,736,023 A | 4/1998 | Gallagher et al. | | |
| 5,980,718 A * | 11/1999 | Van Konynenburg | ...................... | C02F 1/46104 204/551 |
| 6,017,433 A * | 1/2000 | Mani | ...................... | B01D 61/44 204/524 |
| 9,890,065 B2 * | 2/2018 | Servida | .................. | C02F 1/4691 |
| 2002/0084188 A1* | 7/2002 | Tran | ........................ | B82Y 30/00 204/551 |
| 2003/0192783 A1* | 10/2003 | Liang | ...................... | B01D 61/48 204/630 |
| 2004/0035696 A1* | 2/2004 | Reinhard | ................ | B01D 61/50 204/252 |
| 2004/0209150 A1* | 10/2004 | Rock | ........................ | H01M 8/0258 429/434 |
| 2006/0016685 A1* | 1/2006 | Hawkins | ................ | B01D 61/445 204/296 |
| 2009/0218227 A1 | 9/2009 | Noh et al. | | |
| 2009/0223825 A1* | 9/2009 | Lee | ...................... | C02F 1/46109 204/672 |
| 2009/0320253 A1* | 12/2009 | Bourcier | ................ | C02F 1/4691 29/25.03 |
| 2010/0025247 A1* | 2/2010 | Daily, III | ........... | C02F 1/46109 204/554 |
| 2010/0078327 A1* | 4/2010 | Noh | ........................ | B01D 61/50 204/633 |
| 2010/0170784 A1* | 7/2010 | Yang | .................... | C02F 1/4691 204/295 |
| 2011/0240474 A1* | 10/2011 | Seed | .................... | C02F 1/46114 204/660 |
| 2013/0157097 A1* | 6/2013 | Kampanatsanyakorn | .................... | H01M 8/0273 429/105 |
| 2013/0240362 A1* | 9/2013 | Servida | .................. | B01D 61/42 204/661 |
| 2016/0145124 A1* | 5/2016 | Servida | ................ | B01D 61/485 204/630 |

* cited by examiner

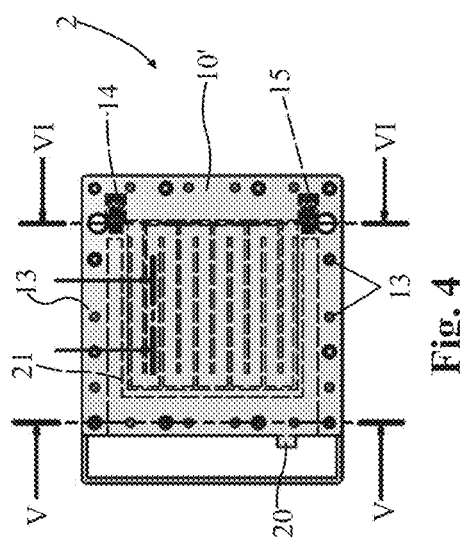
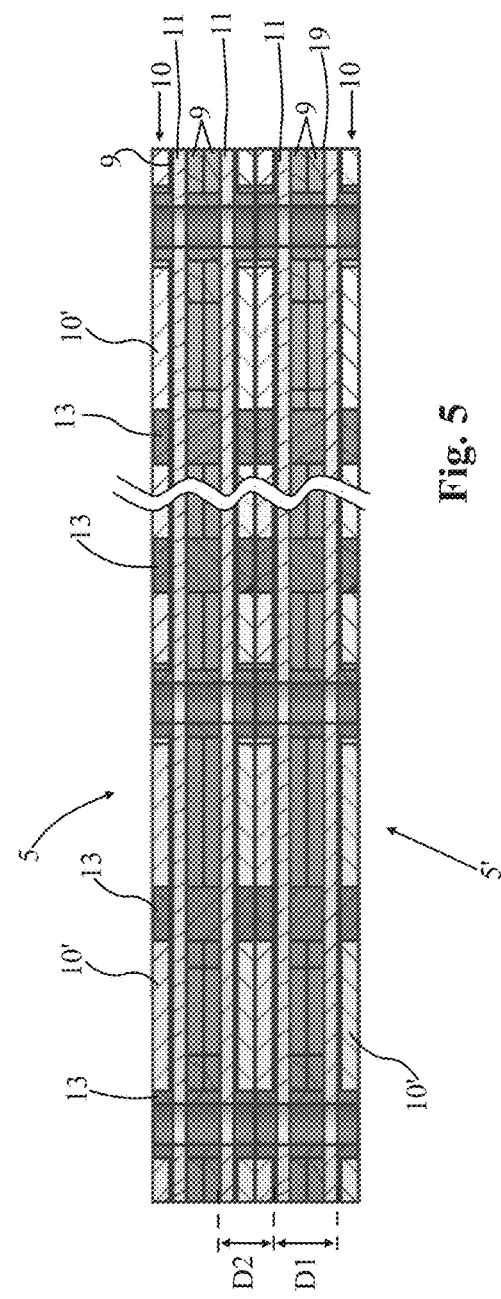

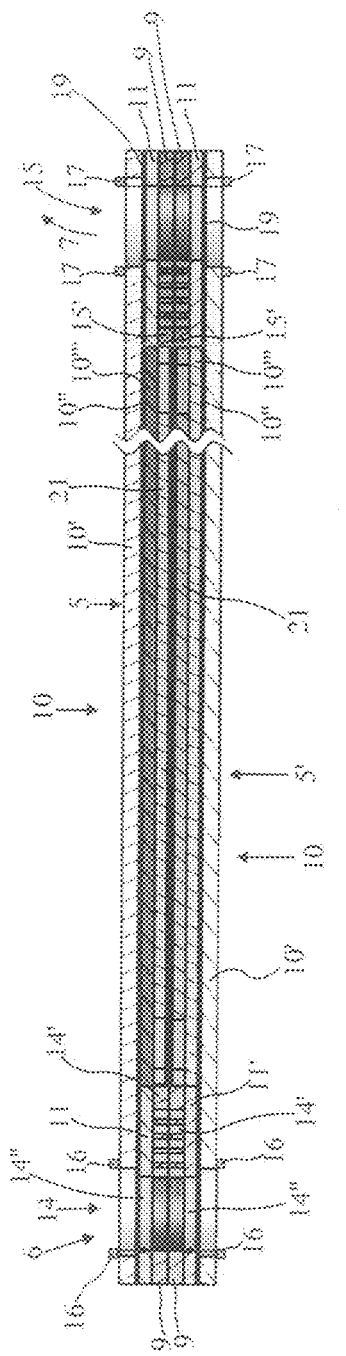
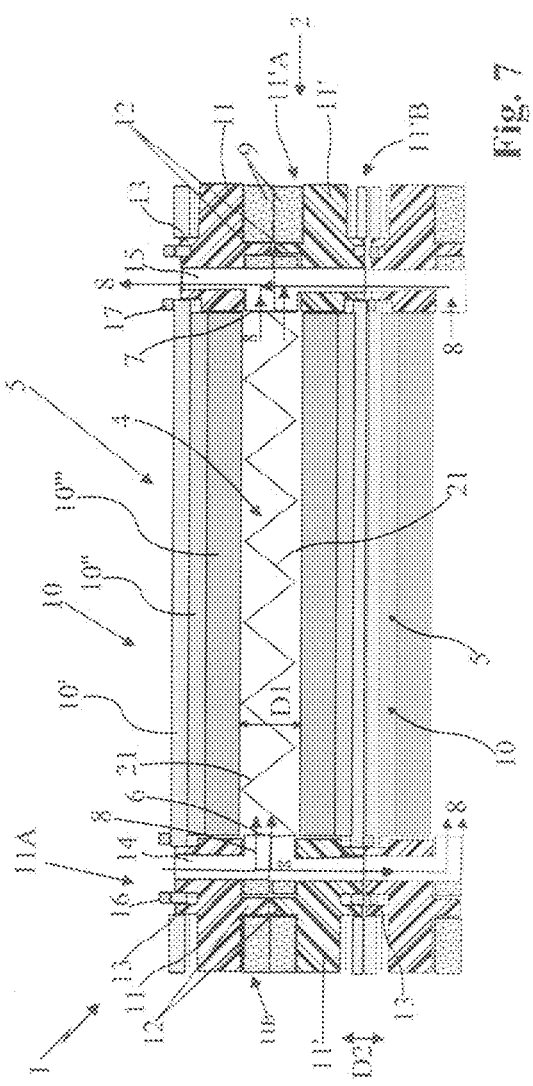

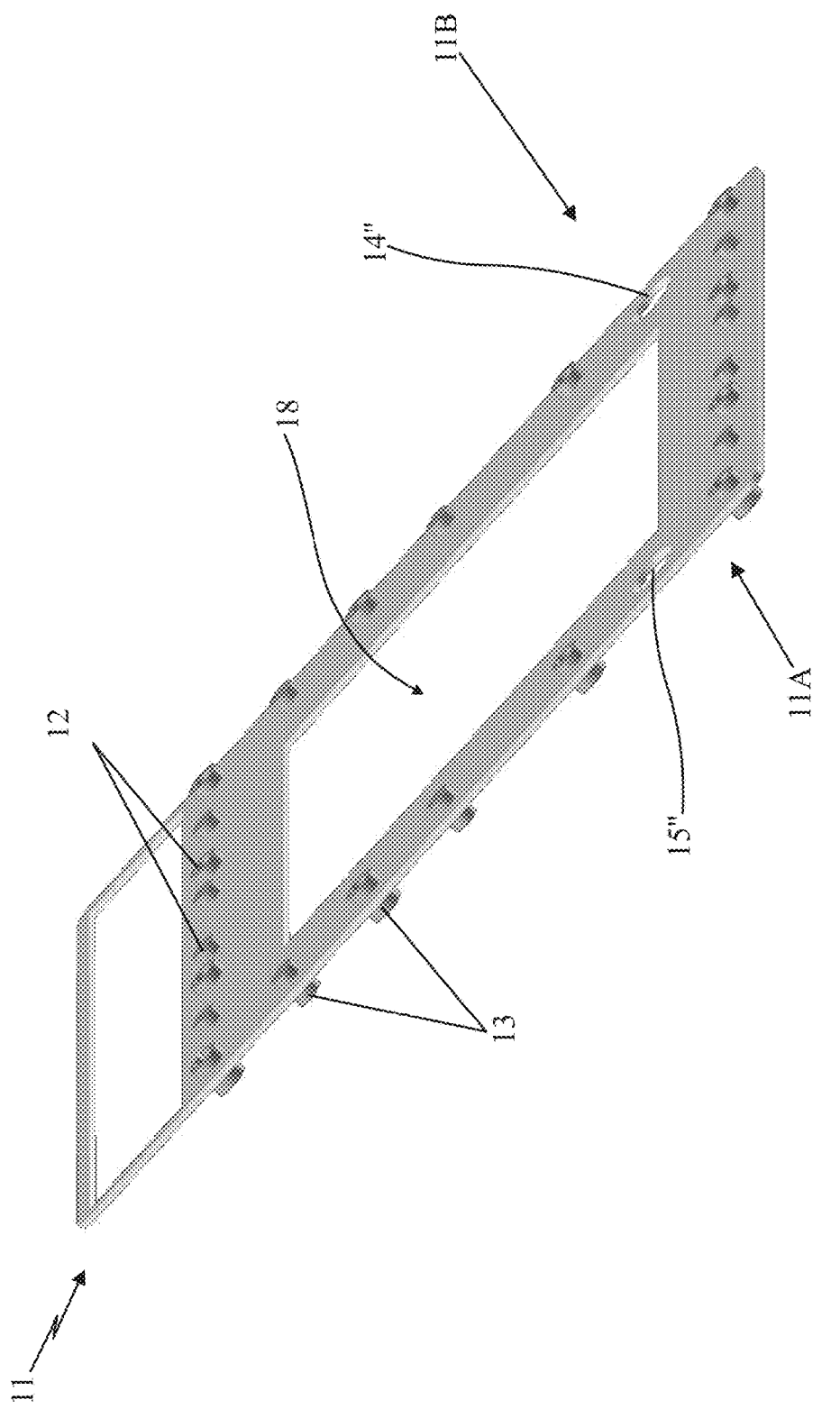

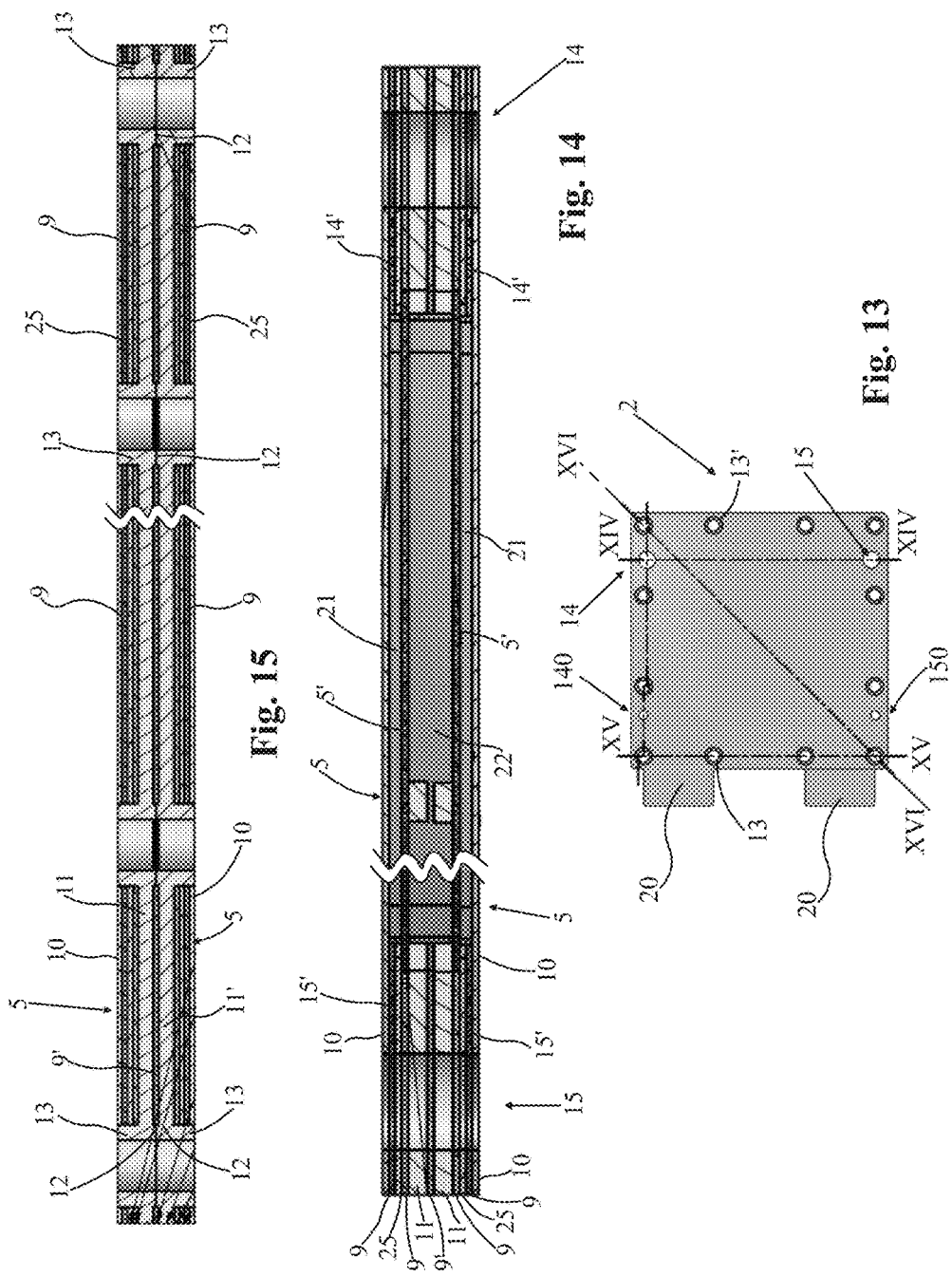

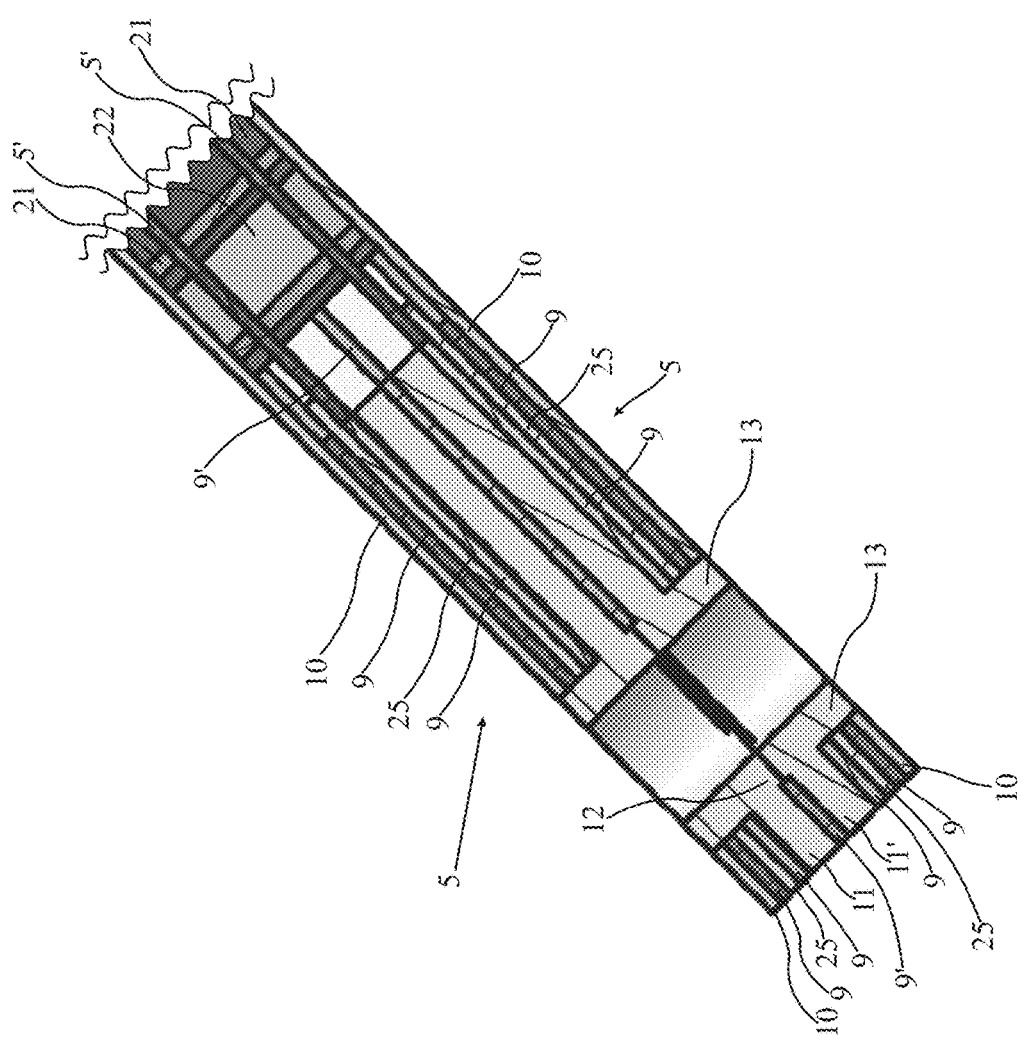

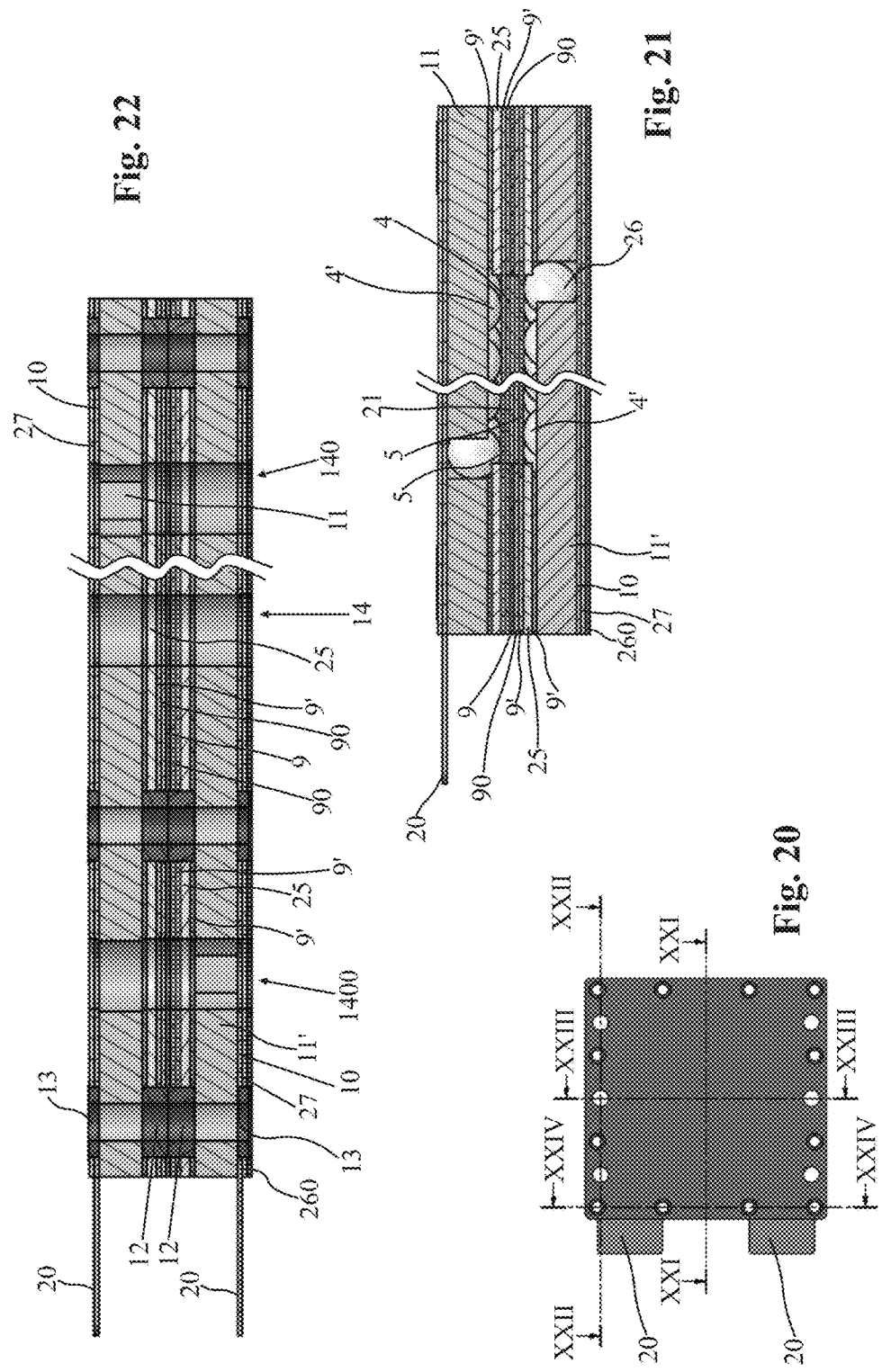

APPARATUS FOR TREATING A FLUID

FIELD OF APPLICATION

The present invention regards an apparatus for treating a fluid, according to the preamble of the independent claim.

The present apparatus is of the type intended to be advantageously employed for very different uses, such as for removing from fluids, and more particularly usually from liquids, undesired concentrations of contaminants e.g. constituted by salts dissolved inside such liquids, for the desalination and/or transfer of ions between different liquid flows, for the concentration of ionized particles or solutes inside fluids (particularly of industrial processes for facilitating the recovery or disposal thereof), for the electrochemical oxidation of organic or inorganic substances and for still other objects.

Examples of apparatuses are those comprising capacitive deionization cells (i.e. a flow-through capacitors), deionization cells for moving charged particles by means of electric field into an evacuation chamber, cells with carbon flow (moving carbon slurry), cells with fuel for the production of energy, electrodialysis cells (normal and reversed) and, more generically, comprising cells provided with electrodes for capturing ions or charged particles present in a fluid arranged to intercept such electrodes. The apparatus according to the present invention is therefore advantageously employable for multiple applications both in industrial and civil fields, and is generally inserted in the industrial area of production of apparatuses and components of apparatuses for the treatment, filtering or purification of fluids or for the production of electricity.

STATE OF THE ART

The apparatuses for treating fluids of known type are formed by layers, successively superimposed on each other, of different components adapted to obtain a stack of elementary cells traversed by at least one fluid to be treated. The characteristics of the elementary cells, i.e. of the layers that constitute them, depend on the type of the same cell which can, for example, be related to a capacitive deionization cell, to a fuel cell, to an electrodialysis cell, to a REDOX cell or yet another cell type.

Such different types of elementary cells have in common the presence of at least one electrode, which must come into contact with the fluid to be treated, and one chamber for treating a fluid containing ionized particles, with the aforesaid electrode housed that is connected via an inlet opening and an outlet opening respectively to a feed manifold and a discharge manifold.

According to the cell type, the following can also be repeatedly provided in the stack of layers that form the stack: ion exchange membranes, separator layers, conductor layers, porous layers or chambers of other fluids (e.g. traversed by a washing fluid or by a slurry) with the relative inlet and outlet opening for the connection with the corresponding feed and discharge manifolds.

A common requirement of the apparatuses for treating fluids of the type indicated briefly above is to precisely calibrate the size of the chambers in which fluid to be treated must flow.

The aforesaid fluid treatment chambers are currently obtained by sealing, by means of suitable seals, the facing containment layers which delimit such chambers in the stack of layers and which are usually spaced from each other by tens or hundreds of micrometers up to a maximum of several millimeters.

The above-described apparatuses for treating fluids have in practice demonstrated that they do not lack drawbacks.

A first drawback is connected to the fact that in order to maximize the efficiency of the aforesaid apparatuses it is necessary to precisely obtain the size of their fluid treatment chambers so as to optimize the surface area of exchange with the electrodes and limit the eddy current resistances that produce heating and operating inefficiencies.

In practice, the aforesaid apparatuses are assembled by means of the use of tie rods which compress together the different layers of the stack of cells and which, also given the elasticity of the seals, nevertheless do not allow precisely defining the size of each single fluid treatment chamber.

In addition, the assembly of the stack of layers is obtained with a pressure substantially selected for the purpose of ensuring the closure seal of the single chambers and the seal of the relative openings with the feed and discharge manifolds.

A second drawback of the above-described apparatuses of known type therefore lies in the fact that upon varying the operating conditions of the apparatuses, for example upon varying the various physical operative parameters of operation such as pressure, temperature and flow rate of the feed flow, the overall forces applied to the stack of layers vary, subjecting the chambers to different forces adapted to modify the size thereof with respect to the optimal size.

A third drawback of the above-described apparatuses of known type lies in the fact that they are designed with a predefined number of layers and hence for a predefined fluid treatment capacity, as well as for example for a predefined capacity to reduce the salinity of a liquid. Therefore, in order to vary the performances of the aforesaid apparatuses it is currently necessary to arrange them in series with other apparatuses, with however little flexibility of adaptation to the specific needs of the requested application.

A fourth drawback lies in the difficulty of carrying out the maintenance of the apparatuses of known type described above i.e. to substitute the damaged parts, such as the obstructed or poorly functioning chambers with other new chambers.

In the particular case of apparatuses for treating fluids of the type employing cells with flow-through capacitors, the surfaces of the conductor layers of the electrodes are often associated with permeable or semi-permeable material layers, capable of selectively trapping the ions that migrate towards the corresponding electrode under the action of the field, obtaining membranes selectively of anion exchange type or cation exchange type. The use of these materials has allowed improving the efficiency of the flow-through capacitors, allowing the retention and concentration on the electrodes of an increased quantity of ions, and more generally of charged contaminants, but has increased the cases of breakage of the apparatuses following the variation of the size of the single retention chambers due to the variations of the physical dimensions of these semi-permeable layers and hence of the apparatus in its entirety.

In addition, the rigid compression existing in the succession of cell layers, obtained with electrode layers and with spacer layers, makes it more difficult to regenerate the cell given the difficulties that the fluid encounters upon reaching the electrodes and in particular the pores of the spongy carbon structure that usually constitutes the electrode, in order to wash the ions or the salts that have deposited or precipitated on the electrodes themselves.

A fifth drawback of the apparatuses of the type currently known lies in the fact that the feed and discharge of the single cells occurs through two corresponding manifolds obtained in the volume of the container, within which the same stack of cells is contained, constituted by two volumes provided on two opposite flanks of the stack and directly connected on one side with the feed and discharge duct of the apparatus and on the other side with the single cells.

The volume of the feed and discharge manifold obtained in the container of the cell represents a "dead" volume, i.e. an unused volume of significant size. The latter is responsible for the formation of fluid dilution "tails" for the fluid to be treated in the connection in series of apparatuses provided for obtaining multiple passages during the treatment of solutions with a high concentration of charged particles to be eliminated, and involves a reduced effectiveness of the apparatus.

In accordance with the teaching described in the U.S. Pat. No. 5,954,937A, in this patent and in particular in its FIG. 3 the electrode layers themselves—which have a layer of active carbon on both sides—are separated from each other by means of spacers. This requires making the electrodes of particularly strong materials. In addition, there is no subdivision of the apparatus into elementary cells that are separately defined and stackable in a versatile manner as a function of the power required by the specific application. Indeed, each electrode of the apparatus supports two carbon layers of two contiguous cells.

Known from the patent US 2009/0218227 is an apparatus for treating fluids comprising a plurality of support plates, each of which provided with a central through opening and supports, at the perimeter edge of such through opening, a module of electrodes comprising two electrode layers on the two opposite faces thereof. The support plates are stacked on each other with the interposition of seals and are sealed together, compressed against each other, by means of fixing means, defining chambers of treatment cells therebetween delimited by the seals and with the electrode layers arranged on the opposite faces of each module of electrodes that define the containment layers of chambers of contiguous cells.

Also the latter apparatus of known type is not particularly versatile, like the apparatus described in the U.S. Pat. No. 5,954,937A, not comprising elementary cells that are separately defined. In addition, the apparatus described in the patent US 2009/0218227 does not have optimal efficiency, given the difficulty of precisely defining the size of each single fluid treatment chamber due to the compressibility, even if minimal, of the seals that delimit it.

The U.S. Pat. No. 5,736,023 describes an apparatus provided with a purification center comprising a plurality of ion concentration and removal compartments, each delimited by a pair of opposite membranes, and a pair of electrodes adapted to create a potential difference through the compartments. The purification center also comprises a plurality of spacer layers each adapted to support a pair of membranes that are spaced from each other and fixing means that retain together and compress the spacer layers and the membranes. In particular the spacer layers are arranged side-by-side each other, with the contiguous membranes in contact with each other. Also the apparatus described in the latter patent does not however have optimal efficiency, since during the operation of the purification center the different alternated ion concentration and removal compartments can be subjected to different stresses that can modify the respective sizes, causing the latter to have non-optimal sizes.

PRESENTATION OF THE INVENTION

In this situation, the problem underlying the present invention is therefore that of eliminating the abovementioned drawbacks of the prior art, by providing an apparatus for treating a fluid which allows obtaining the fluid treatment chambers that constitute the apparatus of optimal size and calibrated in order to improve the efficiency of their treatment of capturing the particles contained in the fluid to be treated.

Another object of the present invention is to provide an apparatus for treating a fluid which is versatile, allowing the adaptation thereof to the production needs of specific applications.

Another object of the present invention is to provide an apparatus for treating a fluid which requires easy, facilitated maintenance.

Another object of the present invention is to provide an apparatus for treating a fluid which is simple and inexpensive to obtain and entirely reliable in operation.

Another object of the present invention is to provide an apparatus for treating a fluid which prevents failure via breakage of the containment structure during the operation thereof.

Another object of the present invention is to obtain a cell with a minimum inner volume. This fact allows, in the case of cells intended to operate cyclically (such as flow capacitors), limiting or eliminating the washing tails, allowing the effective connection in series with multiple apparatuses in order to treat water with high salinity.

Another object of the present invention is to provide an apparatus capable of containing, at its interior, the necessary electronics for the power supply of the cells, in such a manner obtaining an improved operation and less heat creation.

Another object of the present invention is to provide an apparatus for treating a fluid which has a high efficiency/output.

BRIEF DESCRIPTION OF THE DRAWINGS

The technical characteristics of the finding, according to the aforesaid objects, can be clearly found in the contents of the below-reported claims and the advantages thereof will be clearer from the following detailed description, made with reference to the enclosed drawings, which represent several merely exemplifying and non-limiting embodiments of the invention, in which:

FIG. 4 schematically shows a plan view of a cell of the first apparatus embodiment;

FIG. 5 schematically shows a section view made along the line V-V of the half-cell of FIG. 4 in which the thicknesses have been increased with respect to the other dimensions in order to facilitate comprehension, and on which the section of an equivalent cell has been superimposed;

FIG. 6 schematically shows a section view made along the line VI-VI of the half-cell of FIG. 4 in which the thicknesses have been increased with respect to the other dimensions in order to facilitate comprehension;

FIG. 7 shows a very schematic section view, with some parts not shown in order to better illustrate other parts of an embodiment variant of the same first apparatus embodiment in which the thicknesses have been increased to an even greater extent with respect to the other dimensions in order to facilitate comprehension;

FIG. 8A shows a detail of the cell of the apparatus of FIG. 1 relative to a support layer in a first embodiment;

FIG. 13 schematically shows a plan view of a cell of the second apparatus embodiment;

FIG. 14 schematically shows a section view made along the line XIV-XIV of the cell of FIG. 13 in which the thicknesses have been increased with respect to the other dimensions in order to facilitate comprehension;

FIG. 15 schematically shows a section view made along the line XV-XV of the cell of FIG. 13 in which the thicknesses have been increased with respect to the other dimensions in order to facilitate comprehension;

FIG. 16 schematically shows a section view made along the line XVI-XVI of the cell of FIG. 13 in which the thicknesses have been increased with respect to the other dimensions in order to facilitate comprehension;

FIG. 20 schematically shows a plan view of a cell of the third apparatus embodiment;

FIG. 21 schematically shows a section view made along the line XXI-XXI of the cell of FIG. 20 in which the thicknesses have been increased with respect to the other dimensions in order to facilitate comprehension;

FIG. 22 schematically shows a section view made along the line XXII-XXII of the cell of FIG. 20 in which the thicknesses have been increased with respect to the other dimensions in order to facilitate comprehension;

DETAILED DESCRIPTION OF SEVERAL PREFERRED EMBODIMENTS

Figure 1A:
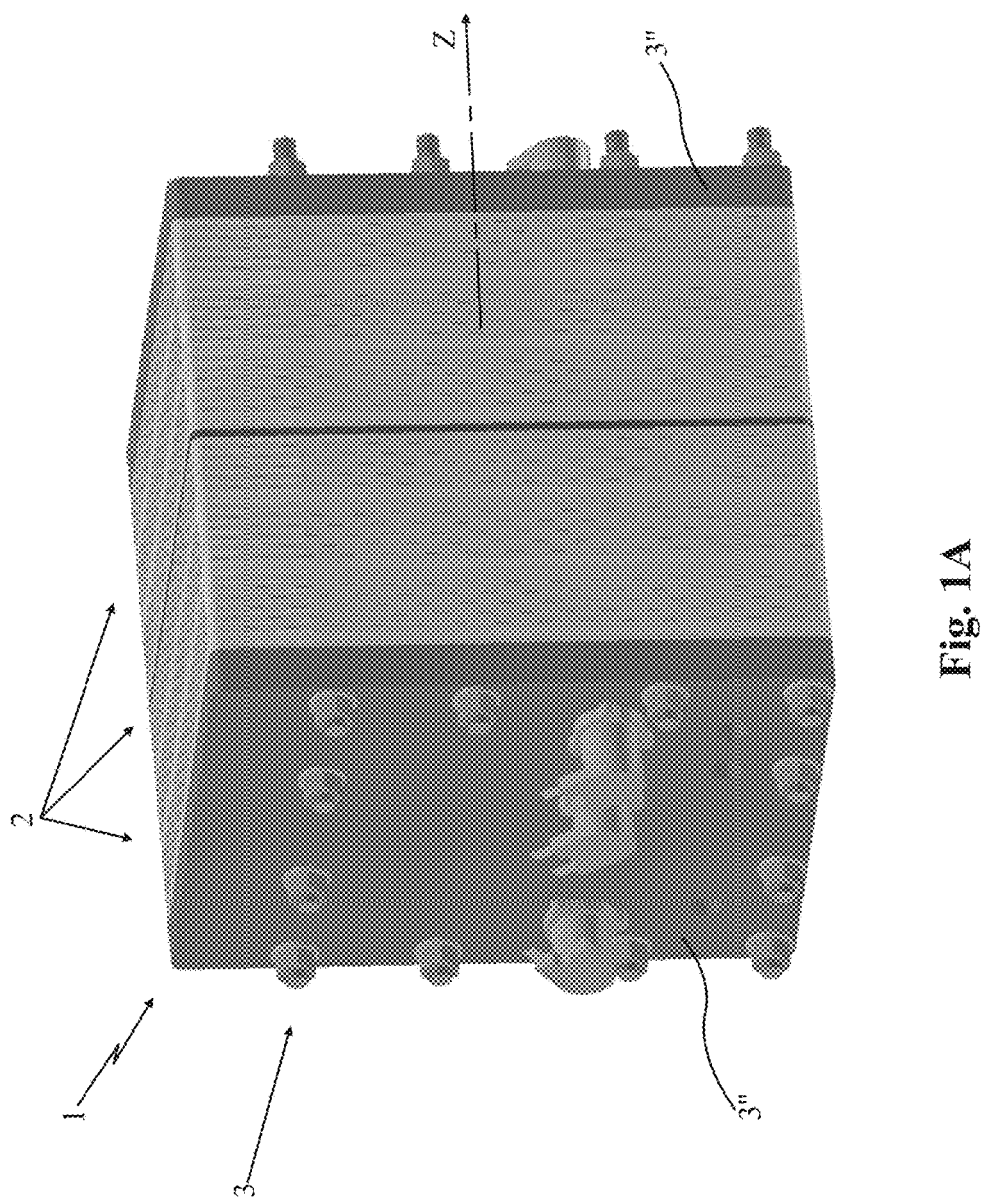
FIG. 1A schematically shows an overall view of a first embodiment of an apparatus for treating a fluid, object of the present invention, in particular employing a plurality of cells with flow-through capacitors.

With reference to the enclosed drawings, three possible embodiments of apparatuses for treating fluids according to the present invention were indicated in their entirety with 1, 100 and 1000. More particularly, indicated with 1 is an apparatus provided with cells with flow-through capacitors; with 100, an apparatus provided with cells that employ two fluids including a fluid to be treated in order to remove charged particles and a washing fluid, as will be better described hereinbelow; and with 1000, a carbon flow cell.

More generally the apparatus according to the invention is intended, as already reported above, to be advantageously employed for very different uses and applications, such as for removing undesired concentrations of contaminants from fluids, for the desalination and/or transfer of ions between different liquid flows, for the concentration of ionized particles, for the electrochemical oxidation of organic substances or for still other objects.

The apparatus 1, 100, 1000 comprises, in per se known manner, a plurality of treatment cells 2, superimposed along an extension direction Z, usually vertical, to form a stack.

Fixing means 3 are then provided, which mechanically compress the treatment cells 2 against each other in order to assemble them together and resist the mechanical stresses that are generated during the operation of the treatment cells 2 following the pressure exerted by the fluid to be treated as well as, in the case for example of capacitive deionization cells, following the concentration of contaminant particles that are accumulated at the electrodes of the cells, as will be explained hereinbelow.

Such fixing means 3 are for example obtained with metal tie rods 3' which grip two terminal plates 3", packing together the treatment cells 2.

The treatment cells 2 employed by the apparatuses 1 according to the invention are for example of capacitive deionization type, fuel type, electrodialysis type (normal and reversed) or, as explained below, of the type provided with electrodes for capturing ions or charged particles present in a fluid arranged to intercept such electrodes, or of carbon flow type.

Therefore, the treatment cell 2 referred to by the present invention is generally of the type employed for treating fluids comprising ionized or in any case charged particles at their interior, such as ions in solution, and for this reason susceptible of being affected by the presence of an electric field, caused by the presence of the electrodes.

Hereinbelow, with the term ionized particles it is generically indicated any particle or contaminant dissolved in the fluid to be treated that is capable of being attracted by an electrostatic field, such as in particular the ions dissolved in a solution.

With reference to the figures of the enclosed embodiments, each said treatment cell 2 comprises at least one central chamber indicated with 4 in the first and third embodiment and with 4' in the second embodiment, which is delimited by at least two containment layers 5, 5' (with such reference it being intended pairs of layers 5, 5' with reference to the first embodiment, as well as 5', 5' with reference to the second embodiment as well as 5, 5 with reference to the third embodiment), substantially facing, and it is provided with at least one inlet opening 6, 6' and with at least one outlet opening 7, 7' for the passage of at least one fluid 8. Inside the same treatment cell 2, also other chambers that are lateral with respect to the central chamber can be provided, for example two other lateral chambers in the second and third embodiment indicated with 4 in the second embodiment and with 4' and 4" in the third embodiment.

More clearly, according to the type of treatment cell 2 employed by the apparatus 1, 100, 1000, multiple chambers 4, 4', 4" can be provided, including at least one central chamber 4, 4' and other chambers 4, 4', 4" also arranged between the two containment layers 5, 5' of a same cell 2 i.e. interposed between two containment layers 5, 5' of two contiguous cells and each traversed by a same fluid or by a different fluid of different nature, as, for example, in the case of a deionization cell, described in the second embodiment, intercepted by a fluid to be treated 8 and by a cleaning fluid 80 which respectively traverse two operating chambers (for the deionization of the fluid) 4 and a central cleaning chamber 4' (for discharging a washing fluid), as explained hereinbelow.

Each treatment cell 2 comprises first sealing means 9, 9' (or also 9' or 9" according to the embodiment of cells described below), perimetrically arranged around each central and lateral chamber 4, 4', 4" in order to seal it with fluid seal.

The apparatus 1 also provides for a plurality of electrode layers 10 arranged inside at least one chamber 4, 4', 4" in order to come into contact with the corresponding fluid that traverses the chamber.

For example, in accordance with the embodiment reported in the enclosed FIGS. 1-10, the electrode layers 10 at the same time act as containment layers 5, 5' of the chambers 4.

According to the idea underlying present invention, each treatment cell 2 comprises at least two support layers 11, 11', each mechanically associated with one of the two containment layers 5, 5' of at least one chamber 4, 4' of the cell 2; for example, as explained hereinbelow, each containment layer 5, 5' is fixed via gluing to a corresponding support layer 11, 11'.

Preferably, such support layers 11, 11' are made of plastic material sufficiently rigid for supporting the other layers mechanically connected thereto and for perimetrically supporting the hydraulic pressure of the fluid contained inside the chamber 4.

In accordance with the invention, first and second spacer means 12, 13 are provided. The first spacer means 12 are interposed between the two support layers 11, 11' of each treatment cell 2, in a manner so as to separate, with a first compression end stop distance D1, the two containment layers 5, 5' of the chamber 4, 4' and thus in a manner so as to limit the maximum compression to which the sealing means 9, 9' are subjected (whose compression depends on the distance between the two containment layers 5, 5', such sealing means 9, 9' being interposed between the two support layers 11, 11' fixed to the two containment layers 5, 5' as in the embodiment indicated in the enclosed FIGS. 1-10 and/or such sealing means 9, 9' being directly fixed to the two containment layers 5, 5'), thus defining the actual opening of the chamber 4.

The second spacer means 13 are interposed between the support layers 11, 11' of two contiguous treatment cells 2 in the stack, forcing them to be at a second compression end stop distance D2 which places in contact the outermost layers of the two contiguous cells 2, limiting however the compression of one cell 2 on the other to a value predefined by said distance D2. Between such support layers 11, 11' of two contiguous treatment cells 2 in the stack, other chambers can be interposed that are more lateral with respect to the central chamber, for example two chambers 4 in the case of the second embodiment and two chambers 4' in the case of the third embodiment.

The idea underlying the present invention arose from the problem of the apparatuses of known type pertaining to the difficulties encountered in the practice of attaining treatment cells 2 that preserved the optimal size of their chambers 4, 4', 4", following the compression by the fixing means 3 set for assembling the stacked-together cells 2.

In particular, the requirements to precisely define the heights of the chambers 4, 4', 4" have up to now clashed with the difficulties of regulating the compression exerted by the fixing means 3 (tie rods), with the requirements of ensuring a correct hermetic seal at the same chambers 4, so as to prevent fluid leakage, as well as finally also with the requirements of not over-compressing the cells 4 in order to leave them expansion margins sufficient for preventing subsequent breakage during normal use. Breakage in particular due to the fact that the electrode layers 10 vary the volume thereof as a function of the ionic form that they assume, in particular due to the presence in the electrode layers 10 of ion exchange membranes, specified in detail hereinbelow, which can assume a contracted or expanded form according to the absorbed ions.

The aforesaid problem is resolved in a surprising manner by the present invention, in which the compression exerted by the fixing means 3 does not modify the size pre-established as optimal for the chambers 4, 4', 4", given that the presence of the first and second spacer means 12, 13 allows on one hand the stacking of the treatment cells 2, maintaining a pre-established value of the maximum compression of the containment layers 5, 5' of the chambers 4, 4' and hence maintaining unchanged their internal distance D1 along with the compression to which the seals 9, 9' are subjected, and on the other hand it allows a predefined compression also of the contiguous cells 2 against each other as well as between the possible chambers 4, 4', 4" interposed between the support layers 11, 11' of two contiguous cells. The mechanical compression set by the fixing means 3 on the treatment cells 2 must fulfill the mechanical requirement of assembling the cells together and the need to obtain the hydraulic connections between the different cells 2 of the stack.

Indeed, the fixing means 3 compress the treatment cells 2 against each other with assembly compression limited by the second spacer means 13, which arrange the contiguous cells 2 in contact with each other at a predefined pressure dependent on the aforesaid second minimum compression end stop distance D2 of the two support layers 11, 11'.

Advantageously, the first sealing means 9, 9' comprise at least one seal, which is subjected to compression by the action of the two support layers 11, 11' of each treatment cell 2 in order to exert its function of sealing the chamber 4. Such two support layers 11, 11' are arranged compressed by arranging the containment layers 5, 5' at the first compression end stop distance D1, in order to define a maximum pre-established compression on the seal 9.

Indeed, during the assembly of the stack of treatment cells 2, once the abutment condition of the first spacer means 12 has been attained, the two support layers 11, 11' of each treatment cell 2 cannot further approach each other and the seal 9, 9', interposed between the containment layers 5, 5' for the seal of the chamber delimited thereby, cannot be compressed beyond that provided in the design for such first compression end stop distance D1.

The seal 9, 9' (at least one) is interposed between the containment layers 5, 5' of each chamber 4, 4' in order to hermetically seal such chamber. For such purpose, such seal 9, 9' can be arranged adherent to the two containment layers 5, 5' in order to peripherally seal the chamber 4, 4' or it can be, additionally or alternatively, fixed on the two support layers 11, 11' (as in the embodiment of the enclosed FIGS. 1-10) if the containment layer 5, 5', as better specified below, is advantageously adherent on the support layer 11, 11' (e.g. by means of gluing).

Preferably, two seals 9, 9' will be provided, each of which fixed to a containment layer 5, 5' of the pair of layers that constitute the at least one chamber 4, and/or to the support layers 11 11' bearing the containment layers 5, 5' fixed thereto, in accordance with the abovementioned embodiment having the containment layers adherent to the support layers, 11, 11'.

In any case, with the term interposition it must be intended that the sealing means 9, 9' or the seals are comprised within the position of the planes of the support layers 11, 11', and they can also be more external peripherally with respect to the two containment layers 5, 5'.

The inlet 6, 6', 6" and outlet 7, 7', 7" openings of the chambers 4 of treatment cells 2 arranged contiguous are respectively connected with each other by means of feed connections 14, 140, 1400 and discharge connections 15, 150, 1500, with the interposition of respective second sealing means 16, 160, 260 and third sealing means 17, 170, 260. Such sealing means are compressed within the aforesaid second compression end stop distance D2 defined by the abutment of the second spacer means 13 that separate the contiguous cells 2 in a precise manner.

Figure 3:
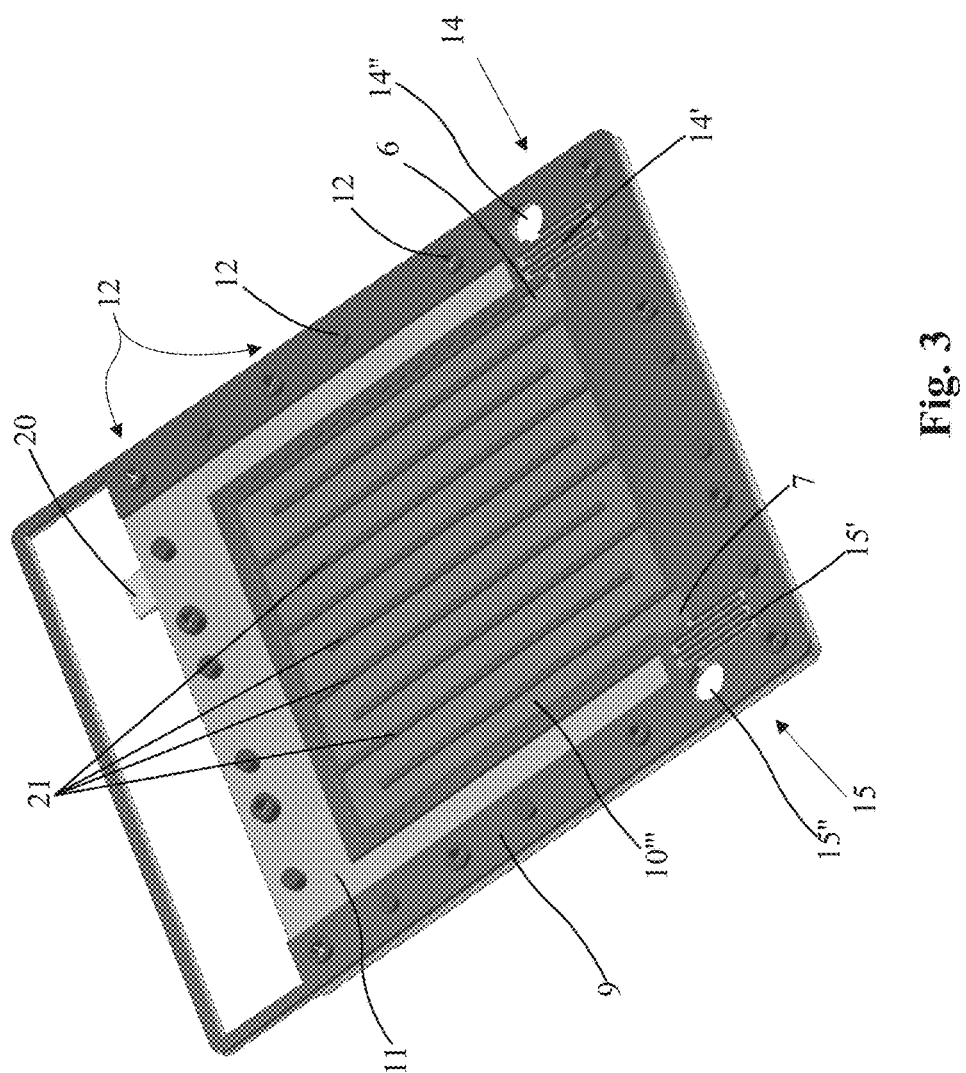
FIG. 3 schematically shows an assembled half-cell of the apparatus of FIG. 1 according to an internal view of the cell.

Advantageously, the feed and discharge connections are obtained with channels 14', 140', 1400', 15', 150', 1500' obtained in the same seals as indicated in FIG. 3, which are in communication with through holes 14", 15" obtained on the support layers which are thus sealed with the contiguous cell 2 by means of the interposition of the aforesaid respective second sealing means and third sealing means. The latter can be made in the form of rigid or elastic seals, or they can be obtained by means of a graphite substrate 10' of the electrode layer 10 suitably shaped with projecting seal lip.

Therefore, the sealing means i.e. also the layers that form the treatment cells 2 will be compressed, packed together by the action exerted by the fixing means 3, such action being however limited by the compressibility of the sealing means i.e. also by the compressibility of the layers that form the cells 2, within the second compression end stop distance D2. The further compression force exerted by the fixing means 3 is in fact counter-balanced by the reaction of the second spacer means 13 of the contiguous treatment cells 2 which are in abutment against each other, preventing the approaching of the treatment cells 2 (and hence their further compression) beyond the distance D2.

Advantageously, the fluid contained in the apparatus 1 is substantially equal to the liquid contained in the chambers 4, 4', 4" of the cells 2, given that manifold volumes for the cells 2 for the liquid feed and discharge are not provided.

Preferably, as for example illustrated in the embodiment of the enclosed FIGS. 1-10, the containment layer 5, 5' of each central chamber 4 is obtained with an electrode layer 10.

In addition, advantageously, (with reference to a preferred characteristic that is not strictly bound to one of the illustrated embodiments), at least one of the support layers 11, 11' of the treatment cell 2, and preferably both support layers 11, 11', has a through window 18 which for example has square form and delimits a perimeter frame on whose two faces the first and second spacer means 12, 13 are obtained. In addition, such support layer 11, 11' bears, fixed on the external face 11A, 11'A, i.e. the face directed in the direction opposite that of the chamber 4, an electrode layer 10 arranged to close the aforesaid through window 18, while it bears fixed on the internal face 11B, 11'B, i.e. the face directed in the direction of the chamber 4, the sealing means 9 i.e., as stated, in the form of a seal.

Preferably, in accordance for example with the FIGS. 1-10, the electrode layer 10 is fixed to the external face 11A, 11'A of the corresponding support layer 11, 11' by means of a glue layer 19.

In turn, each seal 9, 9' is preferably fixed to the internal face 11B, 11'B of the corresponding support layer 11, 11' by means of screen printing, forming by molding or 3D printing with print heads with release of material layers.

The second spacer means 13 are for example obtained in the form of one or more elements 13' projecting from the external face 11A, 11'A of the corresponding support layer 11, 11'. In particular, they are for example obtained in the form of columns integral with the corresponding support layer 11, 11'. Otherwise such second spacer means 13 can be obtained in the form of a perimeter cord in relief projecting from the external face 11A, 11'A of the corresponding support layer 11, 11', preferably also be extended in proximity to the action area of the tie rods of the fixing means.

In order to facilitate the assembly of the treatment cells 2 in the stack that forms the apparatus 1, it can be provided that such second spacer means 13 are obtained on the support layers 11, 11' of contiguous cells 2 in a complementary manner, for example of male/female type in particular for facilitating the centering of the elements during the assembly of the stack.

Preferably such projecting elements 13' will be extended in relief from the external face 11A, 11'A of the frames of the corresponding support layers 11, 11' obtained around the through window 18, by traversing the holes obtained on the electrode layer 10 which, as indicated above, can be advantageously glued on the same external face 11A, 11'A of the support layer 11, 11'.

Such second spacer means 13 can also be provided only on one of the two support layers 11, 11', the other being provided with external face 11A, 11'A substantially flat and only adapted to receive in abutment the second spacer means 13 associated with the support layer 11, 11' of the other contiguous cell 2.

Advantageously, the projecting elements 13' can be made in the form of hollow bushings, integral with the corresponding support layer 11, 11', adapted to receive inside the through hole thereof the tie rods of the fixing means 3.

The second spacer means 13 can also be provided at the inlet and outlet openings of the chambers 4, 4' of each treatment cell 2 and in this case they will be advantageously in the form of tubular elements within which the fluid to be treated will pass to and from the chambers 4, 4'.

The first spacer means 12 are also obtained analogous to the second spacer means 13, for example in the form of one or more elements 12' projecting from the internal face 11B, 11'B of the corresponding support layer 11, 11'.

In particular, they are for example obtained in the form of columns integral with the corresponding support layer 11, 11'. Otherwise, such first spacer means 12 can be obtained in the form of a perimeter cord in relief projecting from the internal face 11B, 11'B of the corresponding support layer 11, 11'. In order to facilitate the assembly of the single treatment cells 2 in the form of closed bodies with hermetic fluid seal, it may be provided that such first spacer means 12 are obtained on the opposite internal faces 11B, 11'B of the support layers 11, 11' of the cells 12 in a complementary manner, for example of male/female type in order to facilitate the assembly of the cells themselves.

Preferably such projecting elements 12' will be extended in relief from the internal face 11B, 11'B of the frames of the corresponding support layers 11, 11' obtained around the through window 18, by traversing the holes obtained on the seal layer 9 which, as indicated above, can be advantageously obtained on the same internal face 11B, 11'B of the support layer 11, 11' (e.g. fixed via gluing or obtained via screen printing).

Such first spacer means 12 can also be provided only on one of the two support layers 11, 11', the other being provided with internal face 11B, 11'B substantially flat or only adapted to receive in abutment the first spacer means 12 associated with the facing support layer 11, 11'.

Advantageously, the projecting elements 12' can be made in the form of hollow bushings integral with the corresponding support layer 11, 11', as a continuation of the bushings obtained on the external face 11A, 11'A in order to receive within the through hole thereof the tie rods of the fixing means 3.

The above-described cells 2 can be assembled together with groups of cells for the purpose of obtaining base modules 200 that can be easily managed in order to be combined together in the formation of apparatuses with performances adaptable as a function of the application specifications.

More in detail, such base modules 200 will provide terminal closure covers 110, 110' arranged to cover the entire surface of the respective terminal containment layers 5, 5', in particular constituted by electrode layers as described above.

Such modules will each internally have electronic control means 30 for controlling the power supply of the single cells 2. For example, in the case of treatment cells 2 with flow-through capacitors, the electronic control means 30 will provide for the optimal distribution of the current to the electrodes of the single cells 2 as well as, for example, the reversal of polarity during regeneration in order to allow the attainment of its operating cycle.

More in detail, the electronic control means 30 comprise at least one board 31 mechanically fixed to a support layer 11, 11' in particular at a through opening 32 thereof, and two terminals 33 electrically connected to said board 31 in order to power supply it. The aforesaid board 31 is in turn electrically connected to the single electrode layers 10 by means of single tabs 20.

The terminals 33 are electrically connectable to an electrical power supply source, not shown, in a manner per se entirely conventional and for this reason not shown in detail.

Advantageously, the terminals 33 are projectingly extended from the board 31 into an externally accessible area in order to be electrically connected to the power supply. In accordance with the embodiment reported in FIG. 9, they are extended parallel to the extension of the stack of treatment cells 2, being inserted in aligned openings obtained on the different superimposed layers.

Advantageously, the aforesaid electronic control means 30 are perimetrically bounded on one face of a support layer 11, 11' (in particular on the internal face 11B, 11'B) by the seal 9, in a manner so as to be electrically and hydraulically isolated from the chamber 4 where the fluid flows.

The direct connection that exists between the electrodes and the electronic control means 30 eliminates the need for costly wiring for high currents outside the cell, simplifying the apparatus and limiting costs.

In the embodiment illustrated in the enclosed FIGS. 1-10, the treatment cell 2 is of the type intended to form a flow-through capacitor provided, in a per se known manner, with a pair of electrode layers electrically connected, by means of suitable manifolds (not shown), to a power supply (usually DC with direct current). The latter charges the contiguous electrode layers 10 with different polarity (e.g. at a voltage of 1.6 Volt) in a manner so as to define an electric field therebetween.

In case of treatment cell 2 of the type with flow-through capacitor, the electrode layer 10 comprises a material with porous structure i.e. with a formation of surface interstitial pores that offer a considerable surface area of exchange with the liquid.

The material that constitutes the electrode layer 10 can nevertheless be any one material known to be employed in the electrochemical processes of flow capacitors and advantageously will comprise spongy active carbon, or it can be constituted by any one of the materials described for example in the U.S. Pat. No. 6,413,409 enclosed herein for reference from line 64 of column 3 to line 41 of column 4, or by flexible conductive sheets of PTFE and carbon particles as described in the U.S. Pat. No. 7,175,783 enclosed herein for reference, or by any material described in the U.S. Pat. No. 6,709,560, enclosed herein for reference, from line 26 of column 6 to line 23 of column 7.

The electrode layer 10 is nevertheless preferably obtained by means of superimposition of multiple layers, whether they are in the form of superimposed sheets of different materials, in the form of paints or in the form of substrates on a same matrix.

More in detail, preferably such electrode layer 10 comprises a current distribution layer 10', e.g. made of graphite, which acts as a support for the other layers of the electrode and is provided with a tab 20 susceptible of being electrically connected to a terminal of a current power supply (not shown) or directly to the electronic board as described above. Such graphite layer 10' is substantially extended to cover the entire external perimeter of the corresponding support layer 11, 11', therefore closing the through window 18 and being fixed to the external face 11A, 11'A of the plastic frame of the corresponding support layer 11, 11' by means of the glue layer 19.

On the internal face 10'A of the graphite layer, a porous conductor layer 10" is then fixed, in particular comprising spongy active carbon. Such layer 10" is preferably provided only at the through window 18 of the support layer 11 and is obtained for example via screen printing, via gluing or with other known methods capable of obtaining equivalent results.

Advantageously, the porous layer 10" is in turn covered by a layer of semi-permeable ion exchange material 10''', it too also advantageously obtained via screen printing.

The purpose of the graphite layer 10' is to attain an electrical connection with the power supply, while the active carbon layer 10″ has the purpose of increasing the current exchange area with the ions or charged particles present in the fluid.

The layer of semi-permeable ion exchange material 10‴ can be associated in various ways with the porous layer 10″. More in detail, such ion exchange layer 10‴ can be separated from the porous layer 10″ or superimposed to cover it, it can be infiltrated in its pores or formed in the same layer of conductor material as is for example described in the U.S. Pat. No. 6,709,560 enclosed herein for reference, from line 27 of column 6 to line 10 of column 7, having analogous behavior to selective ion exchange, and hereinbelow referred to with the same semi-permeable ion exchange material layer terminology.

Such semi-permeable material layer 10‴ can be obtained with a semi-permeable membrane, or with one or more material layers charged for example as described in the U.S. Pat. No. 6,709,560, enclosed herein for reference also from line 50 of column 4 to line 10 of column 7. The semi-permeable material layer 10‴ is adapted to selectively trap the ions that migrate towards the electrode layers 10 under the action of the field during an operating step of the treatment cell 2 with flow-through capacitor better specified hereinbelow, allowing the improvement of the capacitor performances, i.e. allowing the retention, in the aforesaid operating step, of a greater quantity of charged particles. The latter are then at least partly released from the electrode layers 10 during the subsequent regeneration step, in particular for example passing through provided holes obtained in the semi-permeable material layer 10‴.

Advantageously, the containment layers 5, 5' in particular constituted in the embodiment of FIGS. 1-10 by the electrode layers 10, and more particularly by their ion exchange membrane substrates 10‴ as illustrated in the enclosed figures, are separated from each other by at least one spacer layer 21 interposed between the containment layers 5, 5' and through which the fluid to be treated 8 flows, e.g. containing the ionized particles whose at least partial removal is desired.

The spacer layer 21 can also be obtained in labyrinth form in order to determine a specific pathway of the fluid 8 inside the chamber 4, for the purpose of optimizing the treatment in the cell 2.

The spacer layer 21 can also be obtained via screen printing above the semi-permeable material layer 10‴ or it can be obtained with a layer of highly porous non-conductive material, capable of isolating the electrodes and allowing the passage of the fluid flow, such as a porous synthetic material or other non-conductive materials such as glass fiber or nylon fabric.

It is also possible to shape the ion-selective layer 10‴ by means of embossing, for example, for the purpose of obtaining a three-dimension extension of the layer adapted to attain a channel of the fluid defining the spacer layer 21.

Figure 8B:
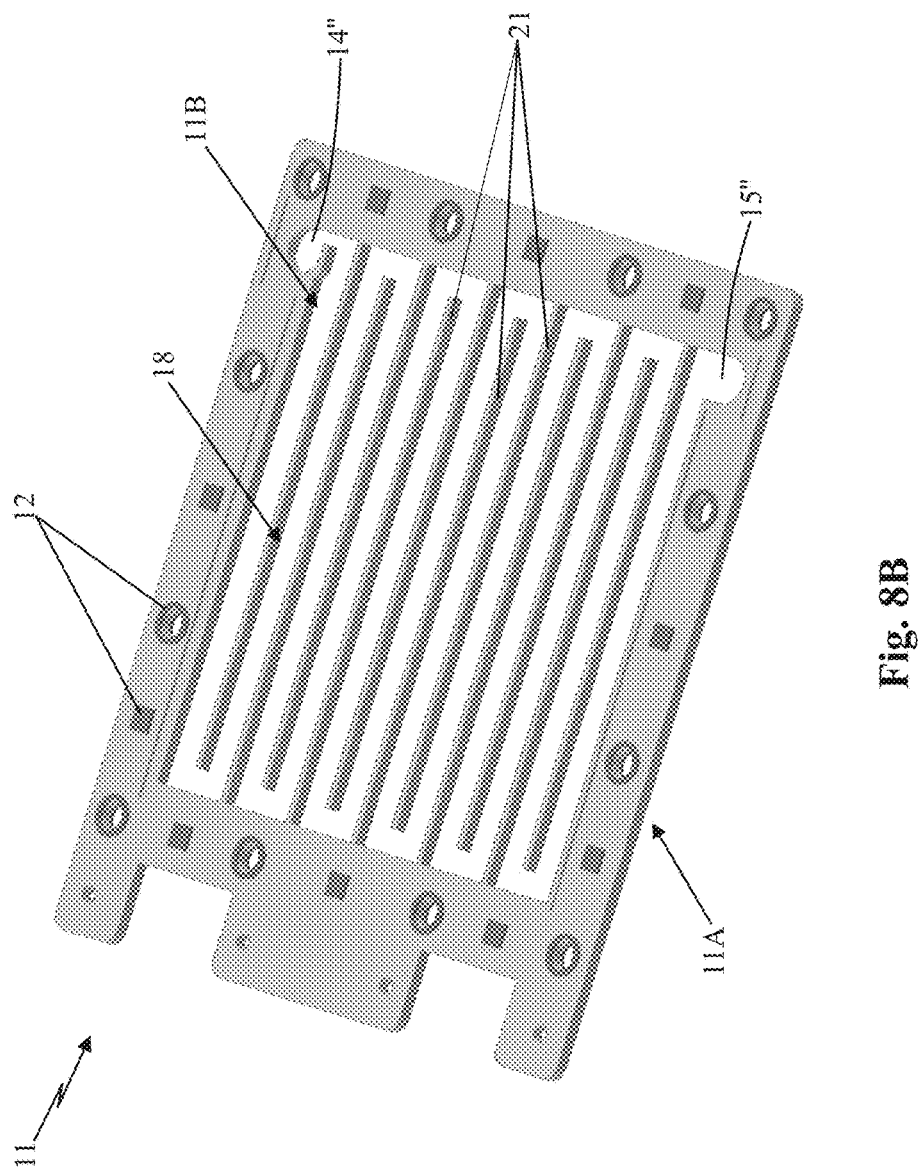
FIG. 8B shows a detail of the cell of the apparatus of FIG. 1 relative to a support layer in a second embodiment.
Figure 10:
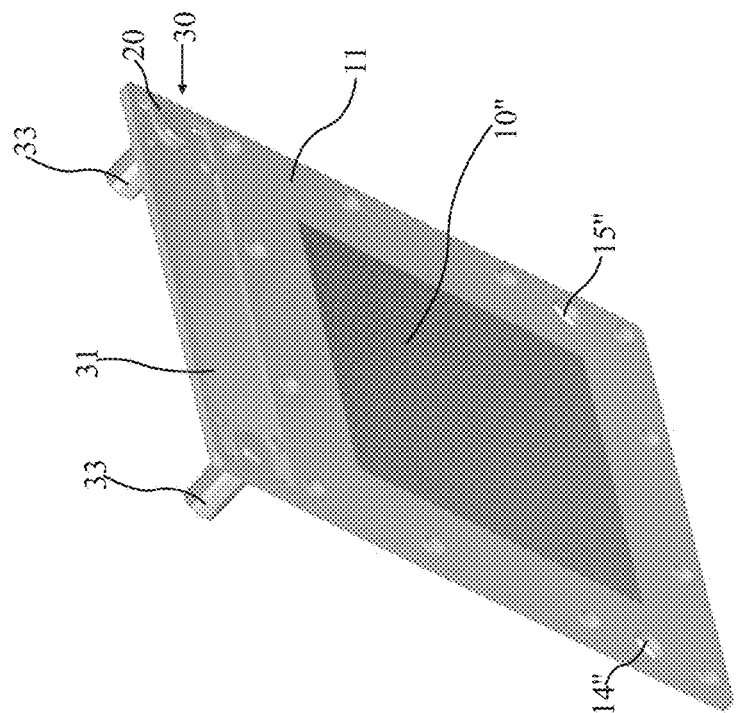
FIG. 10 shows a detail of the module of FIG. 9 relative to a support layer with the aforesaid electronic control means mounted thereon.
Figure 9:
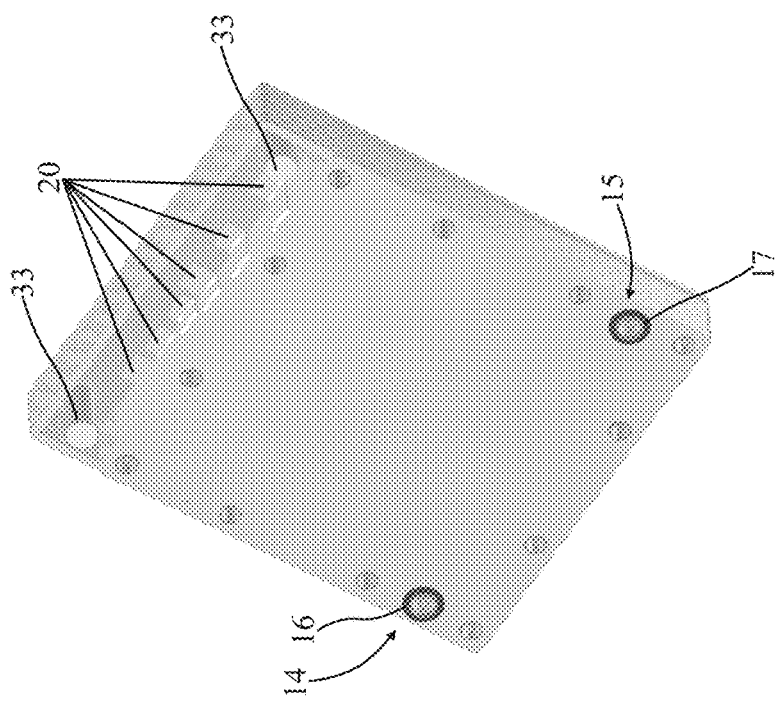
FIG. 9 shows a detail of the cell of the apparatus of FIG. 1 relative to a module of multiple cells assembled together with a cover removed in order to display electronic control means contained inside the aforesaid module.
Figure 11:
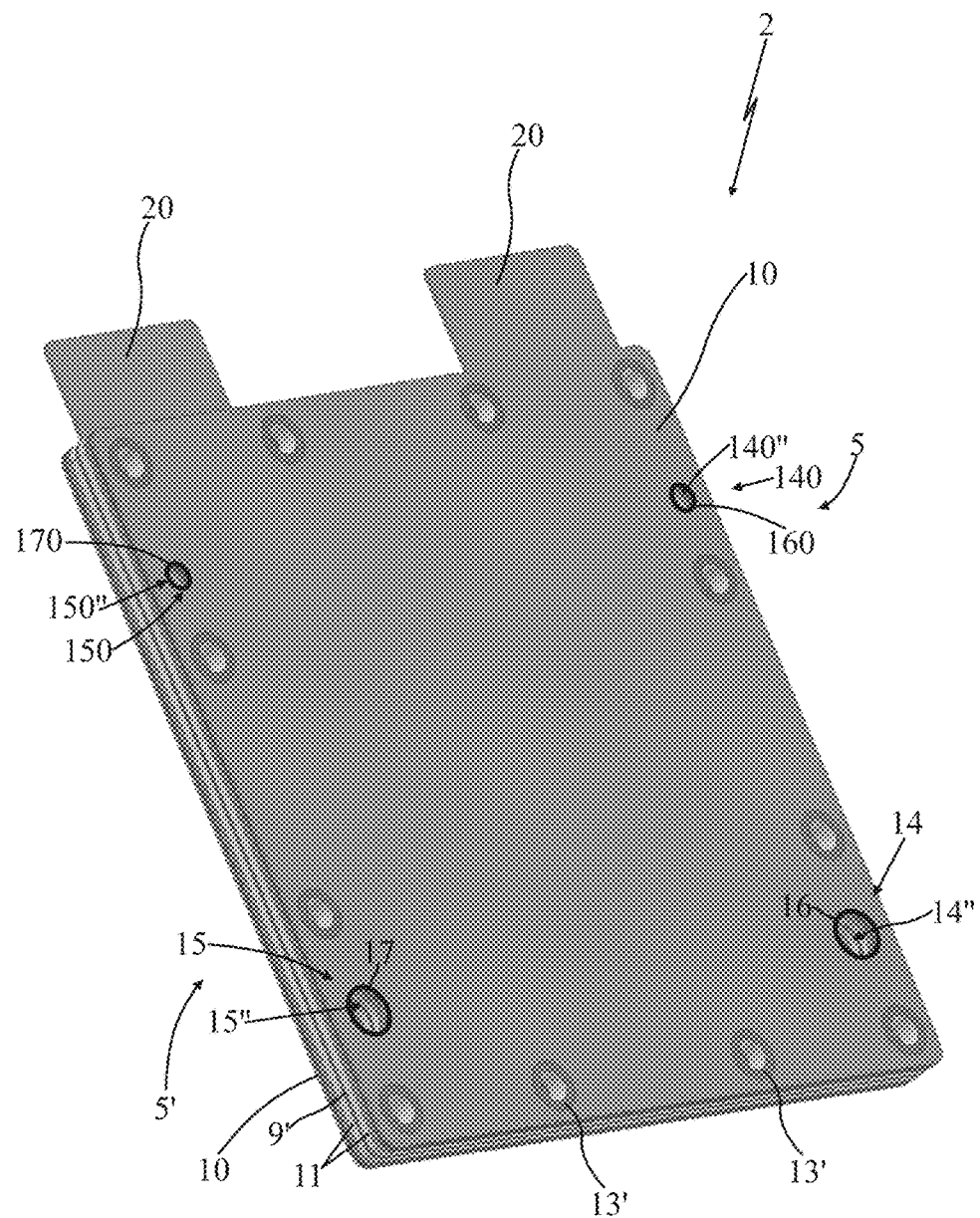
FIG. 11 schematically shows a detail of a second embodiment of the apparatus for treating a fluid, object of the present invention, relative to a deionization cell comprising an intermediate cleaning chamber interposed between two treatment chambers intercepted by corresponding electrodes.

The spacer layer 21 can also be integrally obtained with the support layer 11 as shown in FIG. 8B. The two spacer layers 21 will define the opening of the chamber 4 in which the fluid to be treated 8 passes.

Due to the variation of the size of the ion exchange layers 10‴ in relation to the window 18 obtained in the support layers 11, 11', the structure and the configuration of the spacer layer 21 is attained in a manner so as to ensure a channel of the fluid adapted to avoid a bypass between the inlet and outlet, which would limit the treatment efficiency. In other words, the labyrinth of the spacer layer 21 for the passage of the water, i.e. of the fluid, tends to approach/move away from the support windows, creating a leakage pathway with variable opening.

Advantageously, a rubber layer is provided between the labyrinth exterior and the window for the passage of the liquid to be treated (usually obtained in a seal layer and/or in the support layer etc.) which resolves the problem of leakage given that this rubber layer "follows" the expansions of the membrane and counter-balances them.

It may be possible (in order to improve the seal) "to corrugate" the external perimeter wall of the labyrinth spacer layer 21 in order to lengthen the extension thereof and hence limit the leakage (possibly eliminating it).

The size, shape and distribution of the conductor material layers which form the electrode layers 10, i.e. the size, shape and distribution of the separator material layers interposed between the electrode layers 10, do not form the object of a specific claim and will not be described in detail since they are well known to a man skilled in the art of the field and, merely by way of example, are described in the U.S. Pat. No. 6,413,409 or in the U.S. Pat. No. 6,709,560, enclosed here for reference, in particular from line 11 to line 23 of column 7.

In accordance with the invention, the first spacer means 12 interposed between the two support layers 11, 11' of each treatment cell 2 limit the compression stress to which the seals (or seal) are subjected that are fixed to the internal face 11B, 11'B (i.e. to at least one internal face) of the corresponding support layer 11, 11', since it is not possible to approach the two support layers 11, 11' beyond the abutment defined by the first spacer means 12 and hence it is not possible to approach the containment layers 5, 5' beyond the first compression end stop distance D1.

Analogously, the second spacer means 13, interposed between the support layers 11, 11' of two contiguous treatment cells 2 in the stack, limit the compression stress to which the electrode layers 10 and in particular the current distribution layers 10' made of graphite are subjected, fixed to the external face 11A, 11'A of the corresponding support layer 11, 11', since it is not possible to approach the two support layers 11, 11' beyond the second compression end stop distance D2.

The treatment cell 2 of the type with flow-through capacitors illustrated in FIGS. 1-10 is intended to be fed during the operation of the purification apparatus in which it is integrated, together with a plurality of other cells, with a flow of a first fluid by means of a feed duct. The flow of fluid that traverses the capacitor of the cell 2 is then conveyed in outlet to an extraction duct. For such purpose, each chamber 4 is as specified above provided with an inlet opening and with an outlet opening joined with the corresponding openings of the other chambers 4, as described above.

The electrode layers 10 that form the flow-through capacitor of the cell 2 are electrically connected to a power supply, in particular with direct current, provided with an integrated circuit control board, which controls—in the various operating steps of the capacitor functioning cycle, typically by means of semiconductor switches—the voltage applied at the electrodes by means of suitable connection manifolds.

The functioning cycle of the treatment cell 2 of the type with flow-through capacitors provides for, in a manner per se entirely conventional and well-known to the man skilled in the art, a charge step, in which the power supply charges the contiguous electrode layers 10 with different polarity in order to bring them to a constant operating voltage, for example equal to 1.6 V. The cycle then provides for an operating step, in which, with the electrode layers 10 charged, the flow of fluid to be treated is forced to pass through the capacitor, by means of the feed duct and the extraction duct. During such operating step, the polarized particles are removed from the fluid due to the fact that the ionized particles are attracted by the respective electrodes with polarity opposite thereto, determining a progressive accumulation of the same ionized particles on the same electrodes.

Once the programmed saturation of the electrodes with the polarized particles present in the fluid has been reached, the cycle provides for a step of regeneration, in which with the electrode layers 10 deactivated, a flow of discharge fluid, preferably containing a solubilizing product, is forced to pass into the capacitor with consequent removal of the ionized particles accumulated on the electrode layers 10.

Usually, the discharge flow that passes into the treatment cell 2 during the regeneration step is to be considered a discard (unless the object of the apparatus is that of concentrating a solution), and if this is an apparatus for the deionization of water, it will be sent to the provided normal drain of the hydraulic plant.

Before restarting the operating step, a pre-production step may also take place, in which the flow of fluid to be treated continues to be conveyed to the drain while awaiting the capacitor to reach the charge at the provided voltage, and hence the electrode layers 10 are fully efficient for their action of removing the ionized particles from the liquid.

With the term "deactivated" it is intended to indicate all those conditions to which the electrode layers 10 are subjected before restarting the charge step and which generally provide for a discharge step with short-circuiting of the electrode layers 10, a positive discharge step in which the electrode layers 10 are subjected to a voltage with reversed polarity, aimed to remove the charged particles from the electrode layers 10, where they have accumulated, and a no-voltage step before restarting the charge step.

The electrode layers 10 vary their own volume as a function of the ionic form that they assume, in particular due to the presence of the ion exchange membrane layers 10'''. For example, the cation exchange membranes 10''', when they function with a calcium-rich solution, are found to be in a rather contracted form, given the limited size of the calcium ions. Analogously, when the cell is situated to treat sea water, the cation membranes are situated in sodium form, i.e. still in a rather contracted form. When instead the same membranes 10''' are subjected, during their normal functioning cycle, to the provided steps of regeneration by means of a solubilizing product, such as an acidic solution, these are usually found in hydrogen form or with the functional groups (e.g. $SO^3$) bound to hydrogen ions that considerably increase the size thereof. Therefore, depending on the environment where the semi-permeable membrane 10''' is found to work, considerable variations of volume can be encountered. For example, a variation of 10% for a membrane with 300 µm thickness means that with 100 pairs of electrodes, there is a thickness variation equal to 3 mm. Given that the layers of the cell 1 are already per se normally compressed in order to improve the electrical conductivity of the electrode layers 10, i.e. in particular for optimizing the conductivity between the carbon substrate 10'' and the graphite substrate 10', a considerable increase in the thickness of the membranes 10''' would be susceptible of determining an excessive compression of the electrode layers 10 and the exceeding of a maximum pressure threshold value with a decrease of the efficiency/output of the cell 2.

In the presence of compression beyond a limit threshold value, the deformations of the electrode layers 10 could become irreversible, such that the succession of layers no longer returning to the design size is no longer able to allow the cell 2 to work with optimal performances i.e. with a satisfactory flow rate of fluid that traverses the cell 2 itself.

The fact that the present invention employs first and second spacer means 12, 13, respectively interposed between the two support layers 11, 11' of each treatment cell 2 and between the support layers 11, 11' of two contiguous treatment cells 2, allows rigidly assembling together the cells 2 in the stack while allowing them the possibility to be expanded as a function of the characteristics of the treated fluid and hence without generating mechanical tensions capable of compromising the structural integrity of the apparatus.

Illustrated in FIGS. 11-16 is a second embodiment of the apparatus according to the invention, which employs cells 2 with a different combination of layers with respect to that described above and which is also particularly suitable for being employed for the purification of fluids, removing ionized particles present therein that are susceptible of being affected by the presence of an electric field, such as ions in solution.

Hereinbelow, the term ionized particles will generically indicate any contaminant or particle dissolved in a first fluid 8 to be treated, capable of being attracted by an electrostatic field, such as in particular the ions dissolved in a fluid.

In accordance with this second embodiment of the present invention, each treatment cell 2 comprises at least one first and one second operating chamber, both indicated with the reference number 4, each provided with a corresponding inlet and outlet opening 6, 7 through which the fluid 8 to be treated is susceptible of flowing, and at least one third central cleaning chamber 4' for the evacuation of the cationic particles and/or anionic particles absorbed by the first and second treatment chamber 4. The aforesaid third central cleaning chamber 4' is interposed between the first and the second operating chamber 4, and is provided with a third inlet opening 6' and with a third outlet opening 7', through which a washing fluid 80 flows.

The aforesaid first and second treatment chamber 4 are each respectively delimited by a first containment layer 5 and by a second containment layer 5' for the fluid 8 to be treated, with the two first containment layers 5 more externally arranged with respect to the second containment layers 5'.

Correspondingly associated with the aforesaid first and second chamber 4 are a first and a second electrode layer 10, suppliable with an electrical power supply source at a first and at a second polarity that are opposite each other.

The power supply source will be adapted to provide the aforesaid electrode layers 10 with the aforesaid negative and positive voltages, with direct power supply or pulsed power supply having average voltage value respectively positive and negative.

Advantageously, in accordance with the preferred but non-limiting embodiment of the present invention, illustrated in the enclosed FIGS. 11-16, the first containment layer 5 of each of the two chambers 4 attains on its own the electrode layer 10 associated with the chamber 4, given that such layer 5 is constituted by a conductor material, such as graphite.

The third central cleaning chamber 4' is adapted to receive the cationic particles and/or anionic particles by absorbing them from the two operating chambers 4. The aforesaid third central cleaning chamber 4' is limited by the same second containment layers 5' that inwardly delimit the operating chambers 4. Such second layers 5' are substantially impermeable, parallel to each other and facing. They separately delimit, together with the first containment layer 5, respectively the first and the second operating chamber 4. Such second containment layers 5' are mechanically associated with two support layers 11, 11' that determine, with their spacers 12 and 13, the maximum compression of the central chamber 4' and the maximum compression between the contiguous cells 2 as well as between the layers comprised between the contiguous cells 2 or in this case between the operating chambers 4 of two contiguous cells 2.

With the term substantially impermeable, it must be intended that there can be a leakage of flow between the third central cleaning chamber 4' and one or both of the operating chambers 4 comprised between 0 and 20%.

Preferably the pressure of the fluid in the third central cleaning chamber 4' will be regulated with value less than that of the two operating chambers 4 so as to prevent or limit a leakage of fluid from such third central cleaning chamber 4' to the two operating chambers 4.

Therefore, the above-described configuration of the cell 2 provides for making the washing fluid 80 flow into a third central cleaning chamber 4' interposed adjacent between the two operating chambers 4 where the fluid 8 to be treated transits; third central cleaning chamber 4' is separated from two operating chambers 4 by means of the second containment layer 5' substantially impermeable to the fluid to be treated 8 and to the washing fluid 80 but which allows the selective crossing, under the action of the electric field generated by the electrodes 10, of the ions contained in the fluid to be treated 8.

For such purpose, the two second containment layers 5' each have one or more ion-selective areas associated therewith, such areas susceptible of being traversed by charged particles of corresponding polarity contained in the first and second operating chamber 4, on which the action of the electric field generated by the electrodes 10 acts. At the same time, the ion-selective areas are adapted to retain, in the same third central cleaning chamber 4', the cationic particles or the anionic particles, even if of polarity corresponding to the ion-selective membrane, maintaining them inside the same third central cleaning chamber 4', due to the small movement force induced thereon by the electric field when the charged particles are contained in the aforesaid third central cleaning chamber 4'. With the term "corresponding polarity" it is intended to consider that the anionic ion-selective membrane is more easily permeable to anions than cations, and vice versa the cation ion-selective membrane is more easily permeable to cations than anions.

The electric field within the third central cleaning chamber 4' is present to a very limited extent for the grounds reported hereinbelow.

Inside the third central cleaning chamber 4', a layer of porous electrical conductor 22 is in fact contained that is susceptible of being traversed by the washing fluid 80. This layer of porous electrical conductor 22 is interposed between the two second containment layers 5' with which it is advantageously in close electrical contact so as to limit, inside the third central cleaning chamber 4', the electric field generated by the two electrode layers 10. Such porous electrical conductor causes a shielding effect of the electric field for the volume subtended between the two second containment layers 5' such that the charged particles contained in the third central cleaning chamber 4' do not have the force to pass the ion-selective areas, with low electrical resistivity, of the aforesaid second containment layers 5' even if of corresponding polarity.

The ion-selective areas are a good electrical conductor and therefore they extend the shielding outside the third central cleaning chamber 4' up to the external surface of the two second containment layers 5' of separation with the fluid to be treated 8 that flows into the two operating chambers 4 and which obviously has higher resistivity.

The aforesaid layer of porous electrical conductor 22 is advantageously formed by at least one net made of conductive material, e.g. metal, in particular interposed as a spacer between the two second containment layers 5'. Such net is provided with a three-dimensional structure for allowing the passage of the fluid into the same lying plane thereof.

The ion-selective areas of the two second containment layers 5' are advantageously obtained with membranes selectively of anion exchange type and cation exchange type, which can each be extended for the entire area of an electrode or, otherwise, they can each regard portions of both the electrodes as will be clarified in the embodiments reported hereinbelow.

In accordance with a possible embodiment selection, the two second containment layers 5' of the third central cleaning chamber 4' each comprise a sheet-like support on which prints of ion-selective areas are provided, and in particular for example screen printing of ion-selective areas, obtained starting from anionic and cationic ion-selective paints, e.g. of the type described in the patent EP 2463242 in paragraphs 18-28 enclosed herein for reference. Such anionic and cationic ion-selective areas thus obtained can each cover the entire extension of an electrode or they can regard flanking portions with different ion-selectivity of each electrode, in accordance with the two embodiments specified hereinbelow.

The sheet-like support can for example be obtained with a TNT sheet of 10-30 grams per $m^2$, preferably electrically conductive, with the ion-selective areas obtained by means of screen printing, or more generally by means of a printing process, and preferably made of substantially electrically conductive material.

Between the first and the second containment layer 5, 5' of each of the two operating chambers 4, a porous isolating spacer layer 21 is preferably interposed, such layer susceptible of being traversed and crossed in its extension by the fluid to be treated 8.

The apparatus 1 is advantageously obtained by means of a plurality of superimposed treatment cells 2 of the type described above.

The two supply liquids of the cell, i.e. the liquid to be treated 8 and the washing liquid 80, can also be constituted by the same liquid (e.g. water to be treated and washing water), also arranging a common supply.

Preferably, for example as illustrated in the embodiment of the enclosed FIGS. 11-16, the support layers 11, 11' of the treatment cell 2 have a through window 18, which has for example square form and delimits a perimeter frame on whose two faces the first and second spacer means 12, 13 are obtained. Sealing means 9, 9' are provided for perimetrically and sealingly delimiting the two aforesaid operating chambers 4 and the third cleaning chamber 4".

Advantageously, each support layer 11, 11' bears fixed on the external face 11A, 11'A, i.e. the face directed in the direction opposite that of the central chamber 4', in particular by means of gluing, a perimeter seal 9 of the sealing means, at whose interior one of the two second containment layers 5' is housed alternately constituted for each chamber 4 by a membrane of anion exchange type or of cationic exchange type. Above such membrane 5', a spacer layer 21 is then placed. The aforesaid operating chamber 4 is then closed by means of one of the two first containment layers 5, as stated obtained from an electrode conductor layer made of graphite. Preferably the latter seals on the seal 9 fixed to the plastic support layer 11, by means of a second seal 9 of the sealing means, and advantageously with the interposition of a stiffening frame 25, made of plastic material and delimiting inside a window of smaller size than that of the seals 9 that cover it on both sides.

Analogous to the preceding embodiment, each seal 9 can be preferably fixed to the external face 11A, 11'A of the corresponding support layer 11, 11' by means of screen printing, forming by molding or 3D printing with print heads with release of material layers.

The two second containment layers 5' together delimit the third central cleaning chamber 4'.

For such purpose, on the facing internal faces 11B, 11'B of the two support layers 11, 11' i.e. the faces directed in the direction of the central cleaning chamber 4', a perimeter seal 9' of the sealing means 9 is arranged in particular by means of gluing, at whose interior the layer of porous electrical conductor 22 is housed that is susceptible of being traversed by the washing fluid 80.

According to the invention, also with reference to this embodiment, first and second spacer means 12, 13 are provided. The first spacer means 12 are interposed between the opposite faces, respectively internal 11B, 11'B and external 11A, 11'A, of the two support layers 11, 11' in a manner so as to contain within a first compression end stop distance D1 the sealing means 9', interposed between such second layers 5', and the layer of porous electrical conductor 22 and hence in a manner so as to limit their maximum compression.

The second spacer means 13 are interposed between the support layers 11, 11' of two contiguous treatment cells 2 in the stack, in a manner so as to compress them at a pressure pre-established and limited by the aforesaid second compression end stop distance D2 to which the same support layers 11, 11' are subjected. This allows limiting the compression of one cell 2 on the contiguous cell 2 as well as limiting the compression of the layers interposed between the support layers 11, 11' of two contiguous treatment cells 2 in the stack; interposed layers that in this embodiment comprise the layers that define the operating chambers 4 or, for each cell 2, two seals 9, the stiffening frame layer 25 and the electrode layer 10 or the first containment layer 5.

Since in the succession of layers that form the stack, a central cleaning chamber 4' and two lateral operating chambers 4 contiguous therewith in opposite directions follow each other, the elementary treatment cell 2 can also be identified by a different sequence of three chambers and layers connected therewith, i.e. for example as it can be obtained with a repetitive sequence of two operating chambers and one cleaning chamber. The identification of the cells by means of their functionality—which requires identifying as cell the sequence of one cleaning chamber 4' necessarily interposed between two operating chambers 4—may not be derived from a physical identification of the elementary treatment cell for the purpose of the present invention, or of its description or even for the purpose of obtaining the technical advantage according to the present invention that allows on one hand assembling together the layers of the apparatus with a compression that serves to ensure the mechanical compaction thereof and the hydraulic sealing of the ducts, and on the other hand compressing with a measured force the layers interposed between the two contiguous support layers 11, 11', whether they are of the same cell or of two contiguous cells or whether they are adapted to define the cleaning chamber 4' or two operating chambers 4.

With reference to the enclosed figures, the first and the second spacer means 12, 13 can be obtained in a manner analogous, mutatis mutandis, to those of the preceding embodiment, for example in the form of elements 12' or 13' (advantageously the form of columns integral with the corresponding support layer 11, 11' or in the form of perimeter cords) projecting respectively from the internal face 11A, 11'A or from the external face 11B, 11'B of at least one support layer 11, 11'.

Advantageously, the projecting elements 12', 13' can be obtained in hollow bushing form, integral with the corresponding support layer 11, 11', adapted to receive within their through hole the tie rods of the fixing means 3.

The spacer means 12, 13 can also be provided at the inlet and outlet openings of the chambers 4, 4' of each treatment cell 2, and in this case they will be advantageously in the form of tubular elements within which fluid to be treated will pass to and from the chambers 4, 4'.

In order to facilitate the assembly of the treatment cells 2 in the stack that forms the apparatus 1, it can be provided that such spacer means 12, 13 are obtained on the support layers 11, 11' in a complementary manner, for example of male/female type, in particular in order to facilitate the centering of the elements during the assembly of the stack.

Otherwise, the spacer means 12, 13 can also be provided only on one of the two support layers 11, 11', the other being provided with opposite face substantially flat and only adapted to receive in abutment the aforesaid spacer means 12, 13 associated with the opposite support layer 11, 11'.

Preferably the first spacer elements 12 in the form of projecting elements 12' will be extended in relief from the internal face 11B, 11'B of the frames of the corresponding support layers 11, 11' obtained around the through window 18, and will advantageously traverse holes obtained in the seal layer 9' that surround the porous electrical layer 22.

In turn, preferably the second spacer elements 13 in the form of projecting elements 13' will be extended in relief from the external face 11A, 11'A of the frames of the corresponding support layers 11, 11' obtained around the through window 18, and advantageously traversing the holes obtained on the two seals 9 on the stiffening frame layer 25 and on the relative electrode layer 10 or on the first containment layer 5.

The inlet 6 and outlet 7 openings of the operating chambers 4 of a treatment cell 2, of the type described above with capacitive deionization, will be connected to each other and to those of the contiguous cells 2 respectively by means of the feed connections 14 and the discharge connections 15 with the interposition of the respective second sealing means 16 and third sealing means 17, as already indicated in the preceding embodiment. Such sealing means 16, 17 are compressed within the aforesaid second compression end stop distance D2 defined by the abutment of the second spacer means 13 that separate the contiguous cells 2 in a precise manner.

Figure 12:
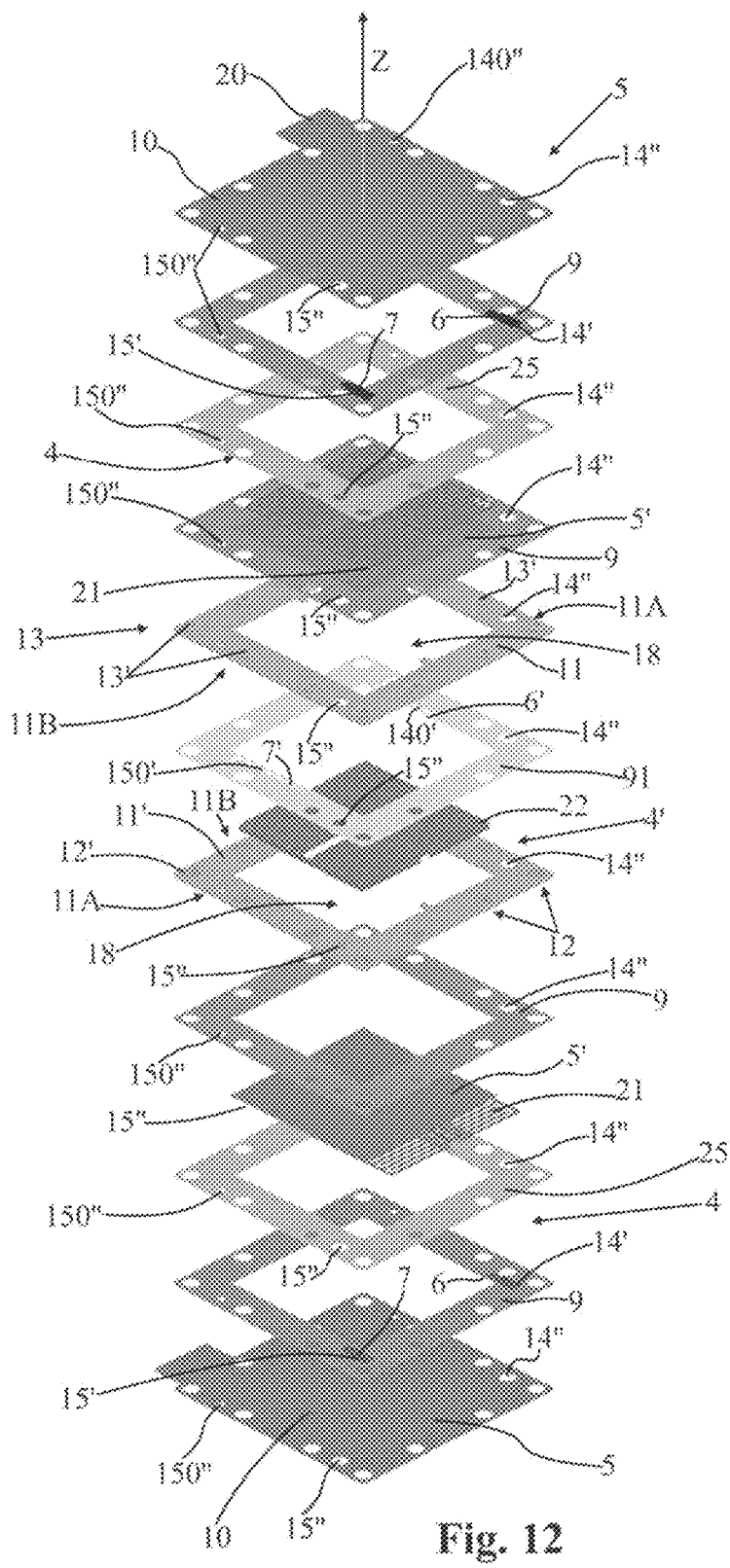
FIG. 12 schematically shows a treatment cell of the apparatus of FIG. 11 in an exploded view.
Figure 17A:
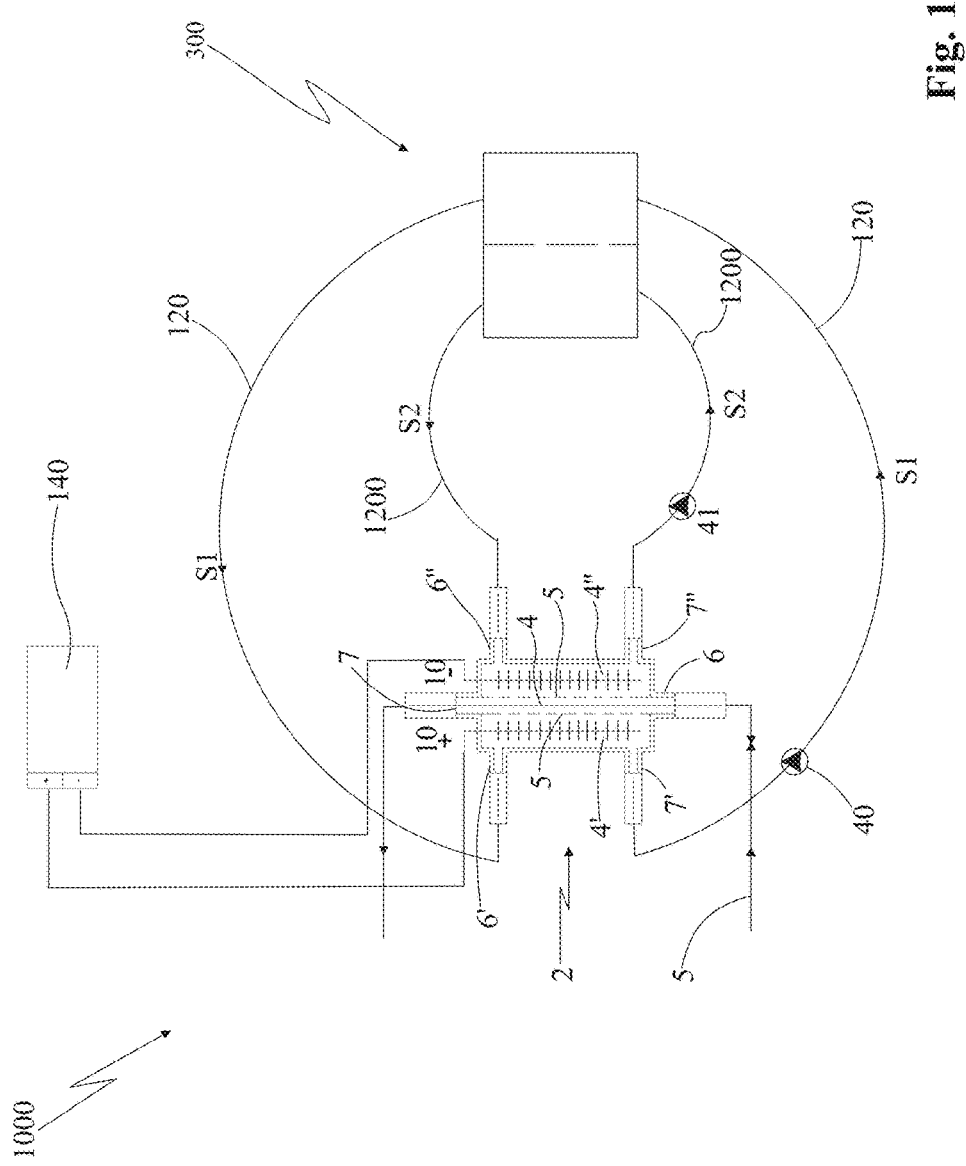
FIG. 17A schematically shows a third embodiment of the apparatus for treating a fluid, object of the present invention, relative to a cell with three chambers including an intermediate operating chamber interposed between two cleaning chambers traversed by slurries, e.g. of carbon particles.
Figure 17B:
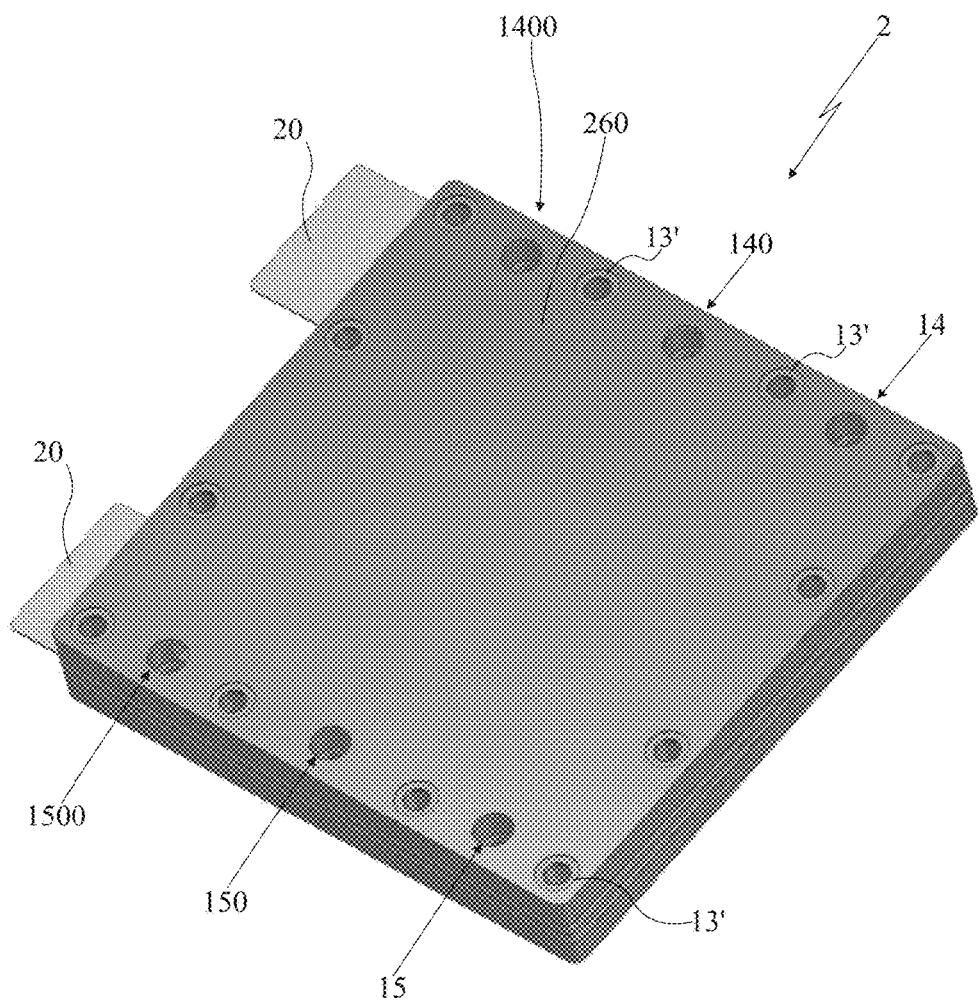
FIG. 17B schematically shows an overall perspective view of a cell of the apparatus of FIG. 17A.

Advantageously, the feed connections 14 and discharge connections 15 of the operating chambers 4 are obtained with channels 14', 15' made in the same seals 9, as schematically indicated in FIG. 12 (the channels 14', 15' are made in the seal as already better illustrated in an analogous manner in FIG. 3), which are in communication with through holes 14', 15' obtained on the first containment layers 5 that are facing the contiguous cells. In addition, the operating chambers 4 of a same cell are in communication with each other by means of holes 14", 15" obtained in the support layers 11, 11' as well as in the holes of the seals 9, 9' and of the stiffening layers 25.

The holes 14" and 15" of the electrodes 10 that form the first containment layers 5 are sealed with the feed connections 14, 15 of the contiguous cell 2 by means of the interposition of the aforesaid respective second sealing means 16 and third sealing means 17. The latter can be made in the form of rigid or elastic seals or they can be obtained by means of a suitably shaped portion of the graphite layer 10 with projecting seal lip.

Therefore, the sealing means 16, 17, i.e. also the layers that form the treatment cells 2 relative to the operating chambers 4, will be compressed, packed together, by the action exerted by the fixing means 3, such action nevertheless being limited by the compressibility of the sealing means 16, 17 i.e. also by the compressibility of the layers that form the cells 2, within the second compression end stop distance D2 that separates the support layers 11 or 11' from those of a contiguous cell. The further compression force exerted by the fixing means 3 is in fact counter-balanced by the reaction of the second spacer means 13 of the contiguous treatment cells 2 which are in abutment against each other, preventing the approaching of the treatment cells 2 (and hence their further compression) beyond the distance D2.

The inlet 6' and outlet 7' openings of the cleaning chambers 4' of a deionization treatment cell 2 of the type described above will be connected to those of the contiguous cells respectively by means of feed connections 140 and discharge connections 150, with the interposition of corresponding second sealing means 160' and third sealing means 170', as already indicated for the operating chambers 4. The feed connections 140 and discharge connections 150 are in this case obtained with channels 140', 150' made in the same seals 9' as indicated in FIG. 12, which are in communication with those of a seal 9' of a contiguous cell by means of through holes 140", 150" made in the support layers 11, 11' as well as in the other provided layers that separate two cleaning chambers of two contiguous cells or rather: seals 9, stiffening frame layers 25 and electrodes 10.

The holes 140" and 150" of the electrodes 10 that form the first containment layers 5 are sealed with the feed connections 140, 150 of the contiguous cell 2 by means of the interposition of the aforesaid respective second sealing means 160 and third sealing means 170.

In operation, the apparatus described up to now mainly from the structural standpoint operates with reference to both embodiments as specified hereinbelow.

The positively and negatively charged particles contained in the liquid to be treated 8 which flow in a continuous manner into the first and second chamber 4 are forced by the action of the electric field produced by the two electrode layers 10 to migrate respectively towards the cathode (negative electrode) and towards the anode (positive electrode). In such migration, the positive cationic particles contained in the fluid of the operating chamber opposite that delimited by the cathode and the negative anionic particles contained in the fluid of the operating chamber opposite that delimited by the anode, which respectively encounter the cationic 5'B and anionic 5'A ion-selective areas of the corresponding second containment layer 5', are forced by the electric field to traverse them, surpassing the potential barrier represented by the ion-selective area until they enter into the third central cleaning chamber 4'.

Once they have entered into the third central cleaning chamber 4', the charged particles are subjected here to a small action of the electric field and hence they are no longer able to traverse the ion-selective areas of the membranes of the second containment layers 5', remaining bound in the substantially equipotential volume of the third chamber 4', before then being conveyed towards the drain by the flow of washing fluid 80 that advances in a continuous manner into the same third central cleaning chamber 4'.

Through the electric field present in the first and second chamber 4, the charged particles present herein are then moved into a volume constituted by the third central cleaning chamber 4' with limited electric field, by surpassing a check barrier constituted by the ion-selective areas of the same walls of the third chamber 13.

The porous electrical layer 22, advantageously constituted in accordance with the abovementioned preferred embodiment by a metal net, determines the isopotential nature of the third central cleaning chamber 4', like a Faraday cage, with shielding of the electric field in order to prevent the conduction of the charged particles outside the same chamber 4' once they have entered within.

In accordance with the FIGS. 17-26, a third apparatus 1000 embodiment is illustrated according to the invention which uses carbon flow cells of the type described and illustrated in the patent application PD2012A000363, mentioned here for reference purposes, from pages 7 to 42.

The apparatus 1000 is advantageously adapted to operate the deionization of industrial process fluids and for the deionization of water, in particular for softening the water of the water supply system and for the desalination of sea water; it is particularly capable of removing, from its interior, salts in solution (such as chlorides and sulfates), nitrates, nitrites, ammonia, and other polarized contaminants of organic substances or micropollutants in general.

The apparatus 1 is also adapted to concentrate ionized particles inside fluids, particularly of industrial processes, in order to facilitate the recovery or the disposal of such particles.

In accordance with the present invention and with the scheme of the general figure No. 17A, the apparatus 1 comprises a first ion absorption cell 2 which at its interior contains at least the three chambers 4, 4', 4" specified hereinbelow.

A first central operating chamber 4 of the first cell 2 is traversed by a flow of fluid to be treated 8 containing cationic particles and anionic particles that can represent pollutants to be removed (such as the salt of an apparatus intended for the desalination of sea water) or substances to recover (such as the metals of a galvanic bath of an industrial process). Such fluid 8 can therefore be an aqueous solution, or it can be a solution in which charged particles are situated dissolved in a non-water-based solvent. Such first central operating chamber 4 is for such purpose fed by means of a first supply duct with the fluid to be treated 8, connected thereto through a first inlet opening 6, and in turn transfers the treated fluid to the exterior by means of a first delivery duct connected to the first central operating chamber 4 by means of a first outlet opening 7. Advantageously, the aforesaid first supply duct is intercepted by a valve for regulating the flow of liquid to be treated 8, which can also be controlled in variable manner by a logic control unit.

A second cleaning chamber 4' of the first cell 2 is traversed by a first operative slurry S1 containing first corpuscles susceptible of being electrostatically charged, for such purpose being provided with a second inlet opening 6' and with a second outlet opening 7' connected to a first circuit 120 in which such first operative slurry S1 circulates.

Inside such second cleaning chamber 4', a first electrode layer 10 is housed, which is positively charged by a first power supply source 140, and forms a first containment layer 5' of the second cleaning chamber 4' towards the exterior of the cell 2.

A third central cleaning chamber 4" is traversed by a second operative slurry S2 containing second corpuscles susceptible of being electrostatically charged, for such purpose being provided with a third inlet opening 6" and with a third outlet opening 7" connected to a second circuit 1200 in which such second operative slurry S2 circulates.

In the first and second circuit 120, 1200 and hence within the second and third central cleaning chamber 4', 4" respectively intercepted by such circuits, the two slurries S1, S2 continuously circulate. For such purpose they are respectively intercepted by first and second circulation means, respectively constituted by a first recirculation pump 40 and by a second recirculation pump 41.

Inside such third central cleaning chamber 4", a second electrode layer 10 is housed, which is negatively charged by the first power supply source 14 and forms a first containment layer 5' of the second cleaning chamber 4' towards the exterior of the cell 2.

The first power supply source 14 is capable of providing, at the electrodes 10 of the two cleaning chambers 4' and 4", the aforesaid positive and negative voltages with direct power supply or with pulsed power supply having average voltage value respectively positive and negative. The value of the voltage will depend on the specific application and on the size of the plant in which the cell 2 is intended to work. In case of desalination of the water of the water supply network for a home system, a voltage value of a few volts could be provided.

Inside the first cell 2, the second and the third chamber 4', 4" are hydraulically separated from each other with the interposition of the first operating chamber 4. More in detail, the second and the third central cleaning chamber 4', 4" are separated from the first operating chamber 4 respectively by means of a first septum and a second septum 5, interposed for at least partial containment of the fluid to be treated 8 that circulates in the first operating chamber 4 with respect to the slurries S1 and S2 that circulate in the second and third chamber 4', 4".

Such first and second septum 5 achieve the containment layers within the second and third central cleaning chamber 4', 4" and together delimit the first operating chamber 4.

They are respectively permeable to at least the anionic particles and to at least the cationic particles, which, as explained below, are forced by the action of the electric field produced by the first power supply source to pass from the fluid to be treated 8 into the first slurry S1 and into the second slurry S2. They must instead retain the first and second corpuscles in the respective first and second slurry S1 and S2 as well as strongly limit, and preferably entirely prevent, the passage of the fluids 8, S1 and S2 through them. According to the application provided and the type of septa employed, a small dilution of a fluid by a contiguous one can be tolerated. It can also be provided to calibrate the circulation pressure of the fluids 8, S1 and S2 in the three chambers 4, 4', 4" in order to prevent or limit such dilutions.

Advantageously the abovementioned septa 5 can be selected from among the following: (cation or anion) ion exchange membranes with different functional groups; isolating porous separators or conductors such as TNT (non-woven fabric) glass fiber structures; microporous membranes such as micro/ultra/nano-filtration membranes; microporous separators with conductive polymers.

Advantageously the slurries S1, S2 can contain first and second corpuscles susceptible of being electrostatically charged in contact with the electrodes and can be constituted by carbon powders with high porosity, or by corpuscles known to be employed in the manufacturing of flow batteries, e.g. $SiO_2$, $TiO_2$, metal oxides, graphene, carbon nanotubes, carbon fibers, carbon nanofibers produced via electrospinning and other substances commonly known for the transport and accumulation of electrostatic charges. These are therefore contained for example in a percentage by weight comprised between 10 and 50% of the flow of overall slurry, typically provided with water as fluid carrier for moving the corpuscles.

The aforesaid power supply source generates a first electric current traveling from the first positive electrode associated with the first slurry S1 that has absorbed the anionic particles to the second negative electrode associated with the second slurry S2 that has absorbed said cationic particles.

Advantageously, the presence of spheres 26 inside the carbon slurry flow chambers allows improving the transfer of current to the moving particles. A sphere in fact "touches" a plane ideally at only one point and therefore does not reduce the active surface of the membrane 5, while it provides the moving particles with a greater surface area in order to improve the electrical contact—without forming serious obstructions to particle movement due to the spherical form. The spheres are indicated with diameter equal to the size of the passage channel but of course they can be made with smaller size.

Extraction means 100 are provided for continuously removing the anionic particles and the cationic particles respectively absorbed by the first operative slurry S1 and by the second operative slurry S2.

The extraction means 100 cause the regeneration of the first and second slurry S1, S2 by removing the anionic and cationic particles therefrom that were respectively absorbed in the second chamber 4' and in the third chamber 4" of the first cell 2. The two slurry flows S1, S2, once regenerated by the extraction means 100, are conveyed by the respective first and second circuit 120, 220 respectively to the second inlet opening 6' of the second cleaning chamber 4' and to the third inlet opening 6" of the third central cleaning chamber 4" of the first cell 2, in order to allow the latter to continuously operate.

Figure 1B:
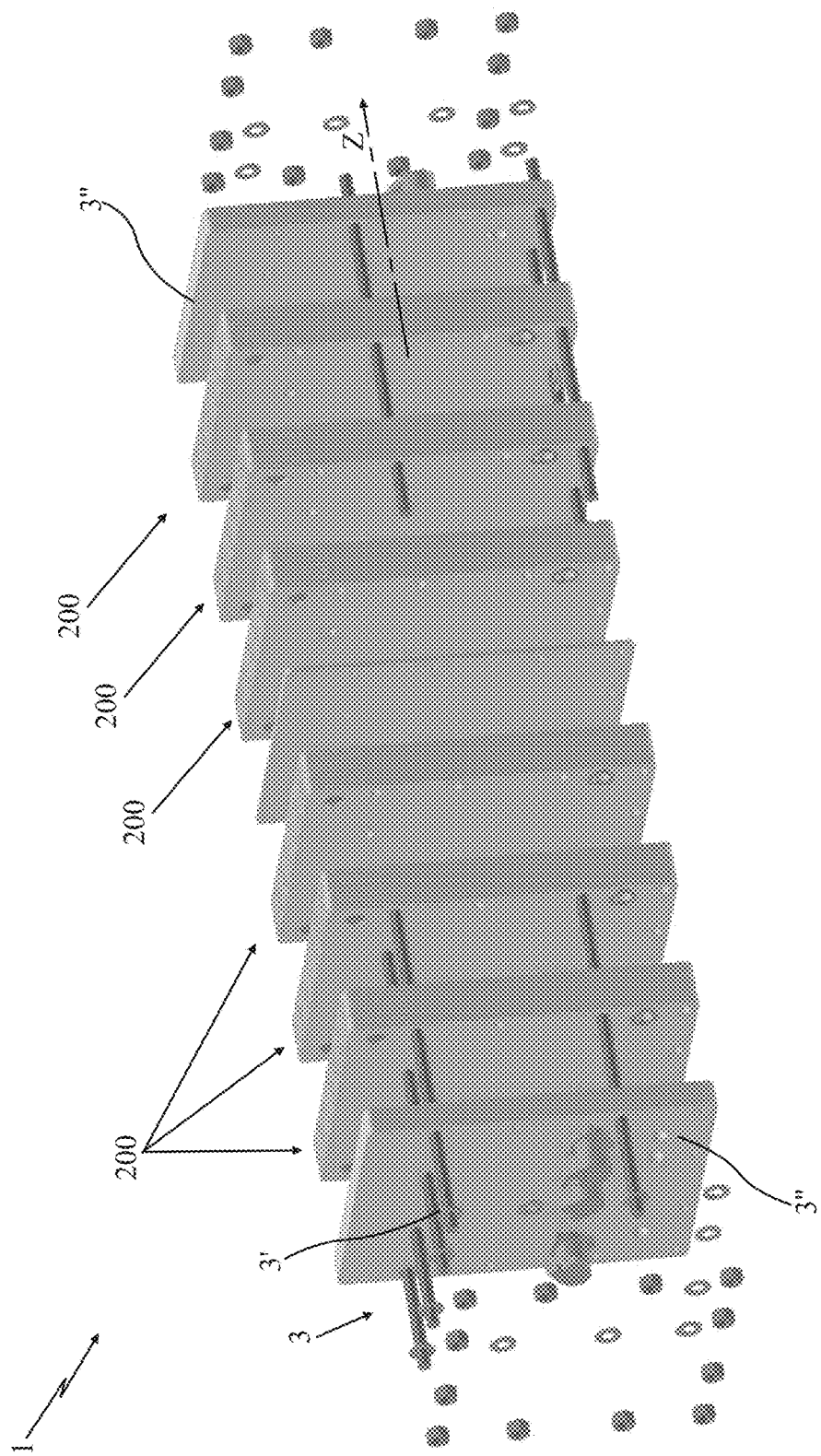
FIG. 1B shows the apparatus of FIG. 1A with some parts in exploded view, in particular with the base modules side-by-side each other.
Figure 2:
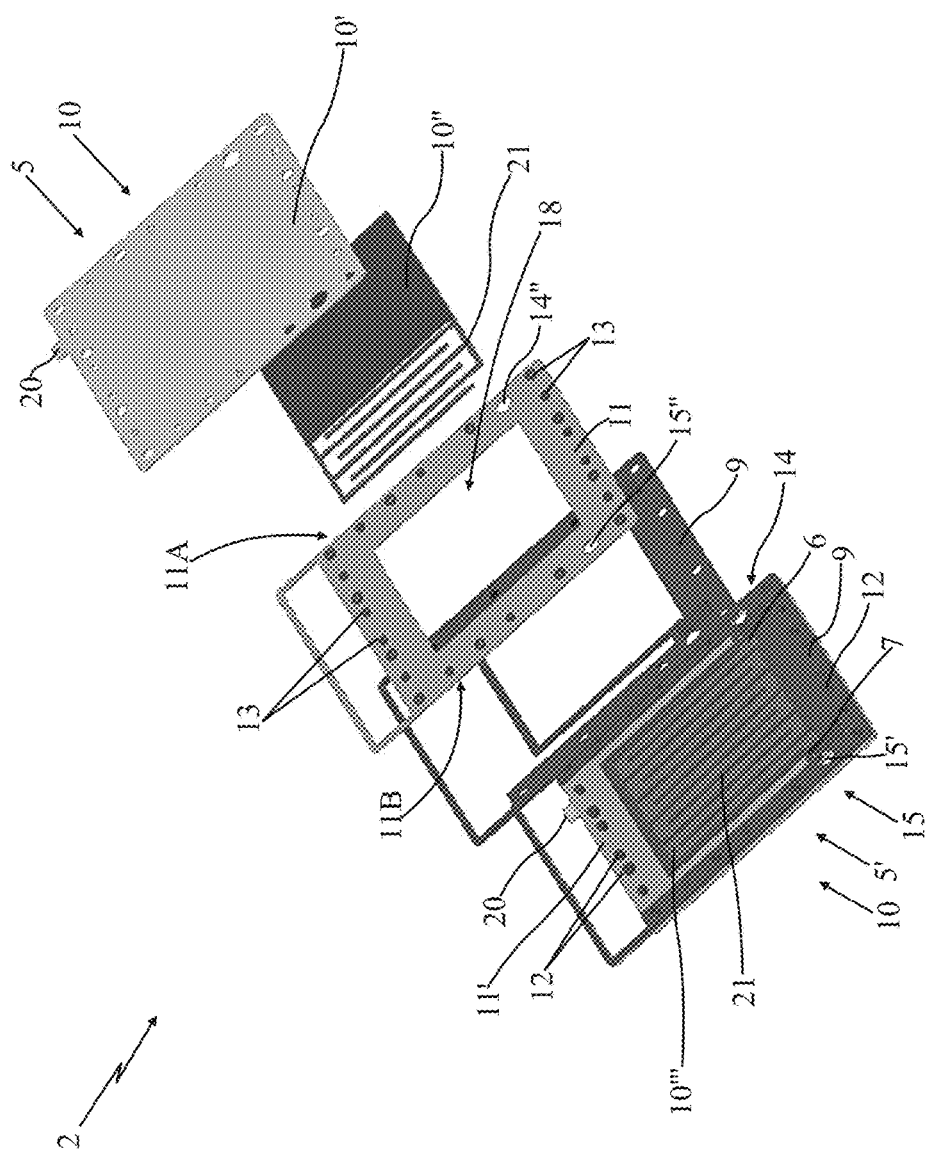
FIG. 2 schematically shows the cell with flow-through capacitors of the apparatus of FIG. 1, in a partially exploded view.

The means 100 for extracting the anionic and cationic particles can be associated with the two slurries by providing common, undifferentiated components for the two slurries, or, as schematized by the dashed line of FIG. 1, they can comprise dedicated components for the selective extraction from the specific slurry of the anionic particles or the cationic particles, for example providing for specific washing means for the two slurries or specific chambers for the selective electrostatic separation of the anionic and cationic particles from the corpuscles of the relative slurry.

The aforesaid extraction means 100 will in any case act on a slurry, continuously drawing and feeding the first cell 1 for an operation of the apparatus that allows obtaining, at the outlet of the first chamber, the treated liquid lacking anionic particles and cationic particles (or at least having a lower quantity thereof).

For such purpose, with reference to the different possible non-limiting embodiment solutions of the present invention, the aforesaid extraction means 100 can be obtained via means for washing the slurries in suitable common slurry tanks or by means of washing means in which the anionic and cationic particles flow that have been separated from the corpuscles of the slurries in contact with corresponding electrodes, i.e. by means of the combined action of electric fields produced by electrodes traversed by the slurries in respective chambers for the separation of the charged particles and washing means in chambers adjoining those containing the electrodes, in accordance with the embodiments illustrated in the patent application PD2012A000363 mentioned here for reference purposes from pages 7 to 42.

More in detail, with reference to the enclosed figures, starting from the outermost layer of FIG. 18A up to outermost layer of FIG. 18B, it is possible to consider the sequence of layers specified hereinbelow.

The aforesaid first and second cleaning chamber 4', 4" where the two slurries S1 and S2 flow are as stated bounded towards the cell 2 exterior by two electrode layers made of graphite 10, thus also indicated as first containment layers 5'. These are advantageously externally covered by a plastic reinforcement layer indicated with 27 that performs the function of stiffening the electrode layer made of graphite 10 in order to better support the spheres 26.

Such electrode graphite layers 10 directly rest on the support layers 11, 11' advantageously without interposing a seal, due to the seal of the graphite.

The support layers 11, 11' are provided with a through window 18, which for example has square form and delimits a perimeter frame on whose two faces the first and second spacer means 12, 13 are obtained. The form of such means 12, 13 can be analogous to that described in the preceding embodiments and hence is not discussed in detail herein.

Each second containment layer 5 obtained with one of the abovementioned septa closes the aforesaid first and second cleaning chamber 4', 4" towards the interior of the cell, and closes with the other containment layer 5 the central operating chamber 4.

The two second containment layers 5 that externally delimit the two lateral cleaning chambers 4', 4" together delimit the central operating chamber 4.

Sealing means 9 are provided for perimetrically and sealingly delimiting the aforesaid central operating chamber 4. They can be obtained, as in the embodiment of the enclosed figures, with two seals 90 with a further seal 9 in relief (or more generically a spacer layer in relief) interposed in which the channels 14', 15' are obtained of the feed connections 14 and discharge connections 15; or they can be obtained with a single seal 9 in relief.

Above at least one of the second containment layers 5', at least spacer layer 21 is advantageously arranged which receives the fluid from the channels of the seal 9.

Also provided for are sealing means 9' for perimetrically and sealingly delimiting the aforesaid cleaning chambers 4', 4".

More in detail, the internal face 11B, 11'B of the support layer 11, 11' is covered by sealing means 9' constituted by a seal on which a stiffening frame 25 rests with a further seal 9' superimposed, in whose window the second containment layer 5 is housed. Such stiffening frame 25 has a narrow window with respect to the seals 9', which therefore partially surmount it on both sides. The second containment layer 5 is in turn substantially housed to size in the second seal 9' such that this also rests on the stiffening frame 25 and advantageously has equal thickness with respect to the aforesaid second seal 9'.

In accordance with a variant embodiment, it will be possible to rest the second containment layer 5 (the septum or membrane) directly on the internal face 11B, 11'B of the support layer 11, 11', in this manner eliminating the need for a seal 9' and the stiffening frame 25.

The three circuits of the fluid to be treated 8 and of the two slurries S1 and S2 will remain separated from each other and therefore the respective inlet 6, 6', 6" and outlet 7, 7', 7" openings of the operating chamber 4 and of the cleaning chambers 4' and 4" of a treatment cell 2 of the above-described type will be connected to those of the contiguous cells 2 respectively by means of the feed connections 14, 140, 1400 and the discharge connections 15, 150, 1500 with the interposition of the respective second sealing means and third sealing means as already indicated in the preceding embodiments. Such second sealing means and third sealing means are compressed within the aforesaid second compression end stop distance D2 defined by the abutment of the second spacer means 13 which separate the contiguous cells 2 in a precise manner.

Advantageously, such second sealing means and third sealing means are obtained with a single graphite layer 260 interposed between two contiguous cells 2 and provided with holes traversed by the second spacers 13.

Figure 18A:
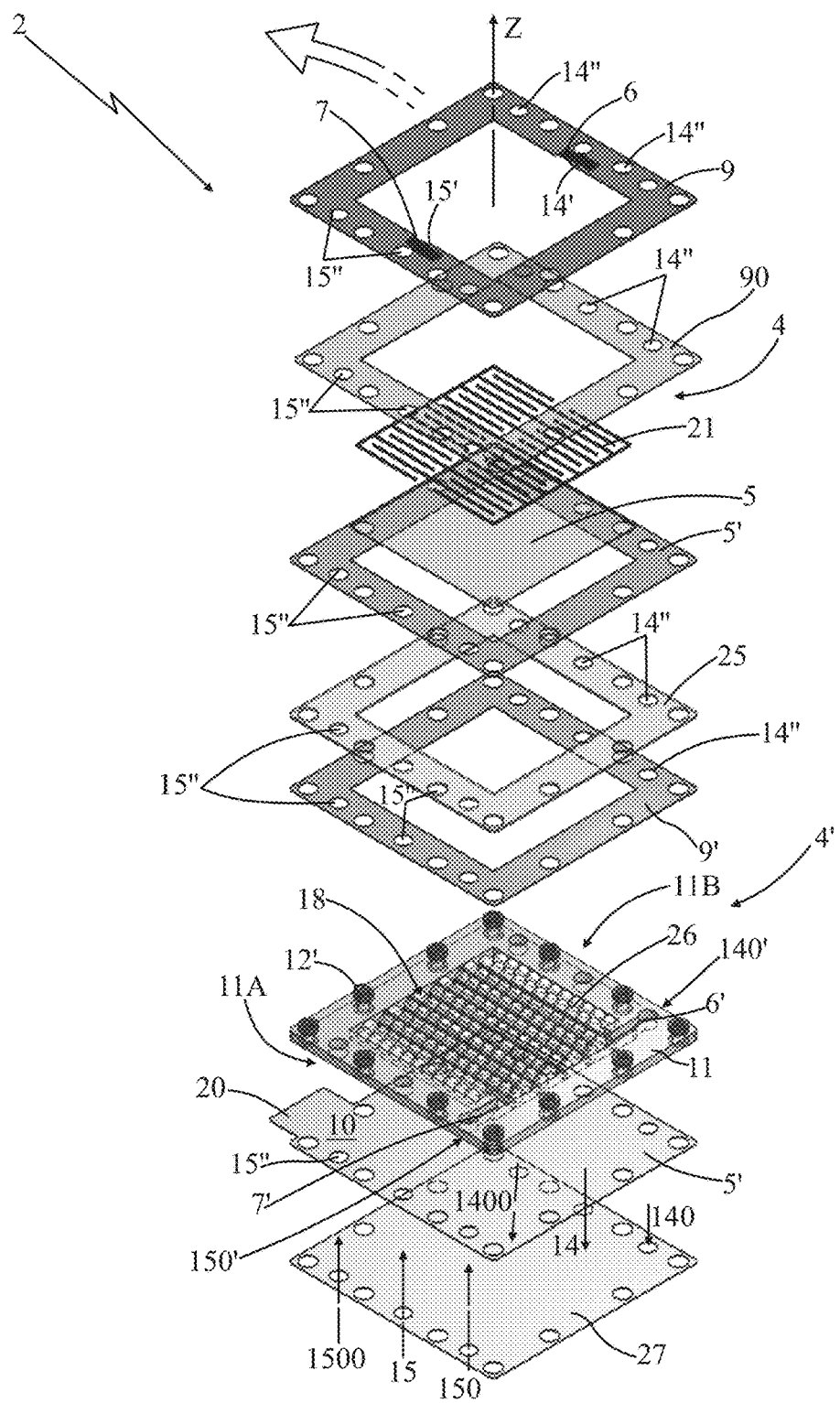
FIGS. 18A and 18B together schematically show the cell with flow-through capacitors of the apparatus of FIG. 17A, in an exploded view.
Figure 18B:
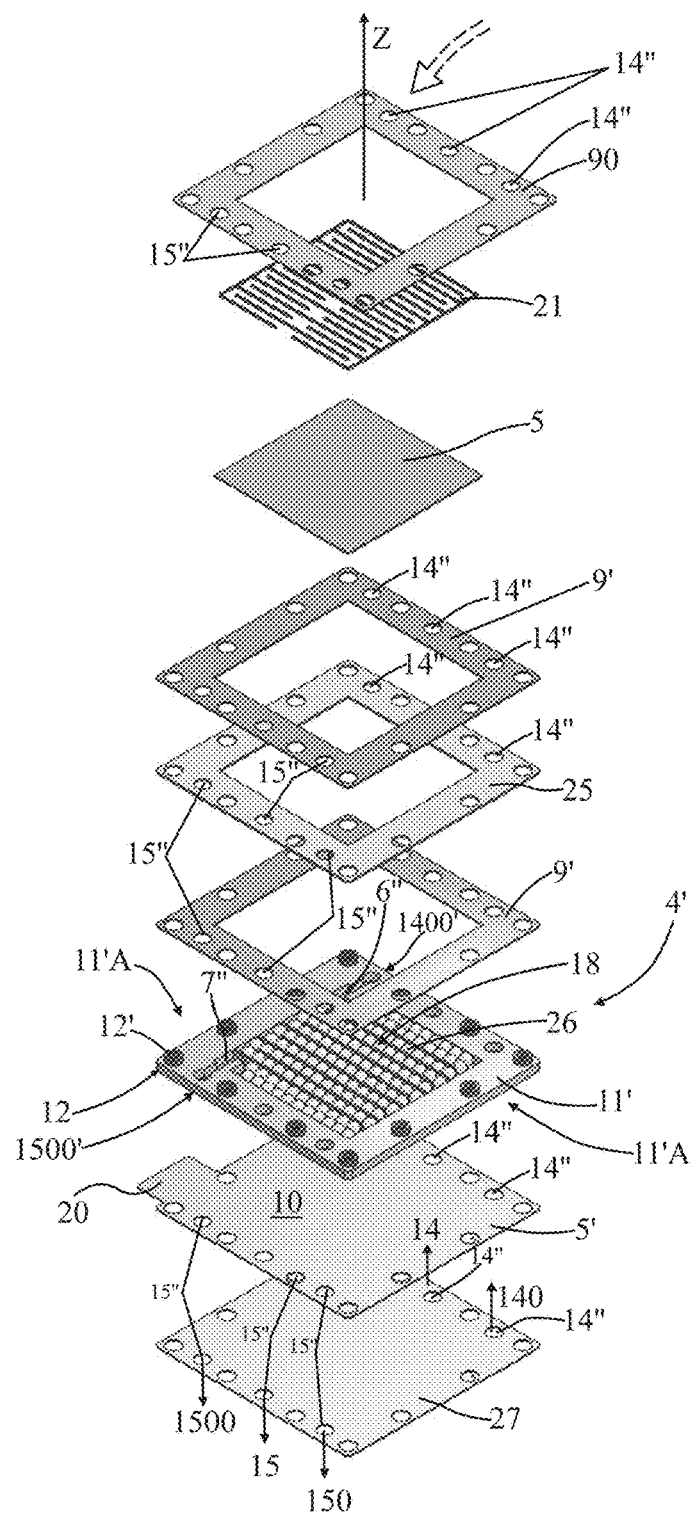
Figure 19:
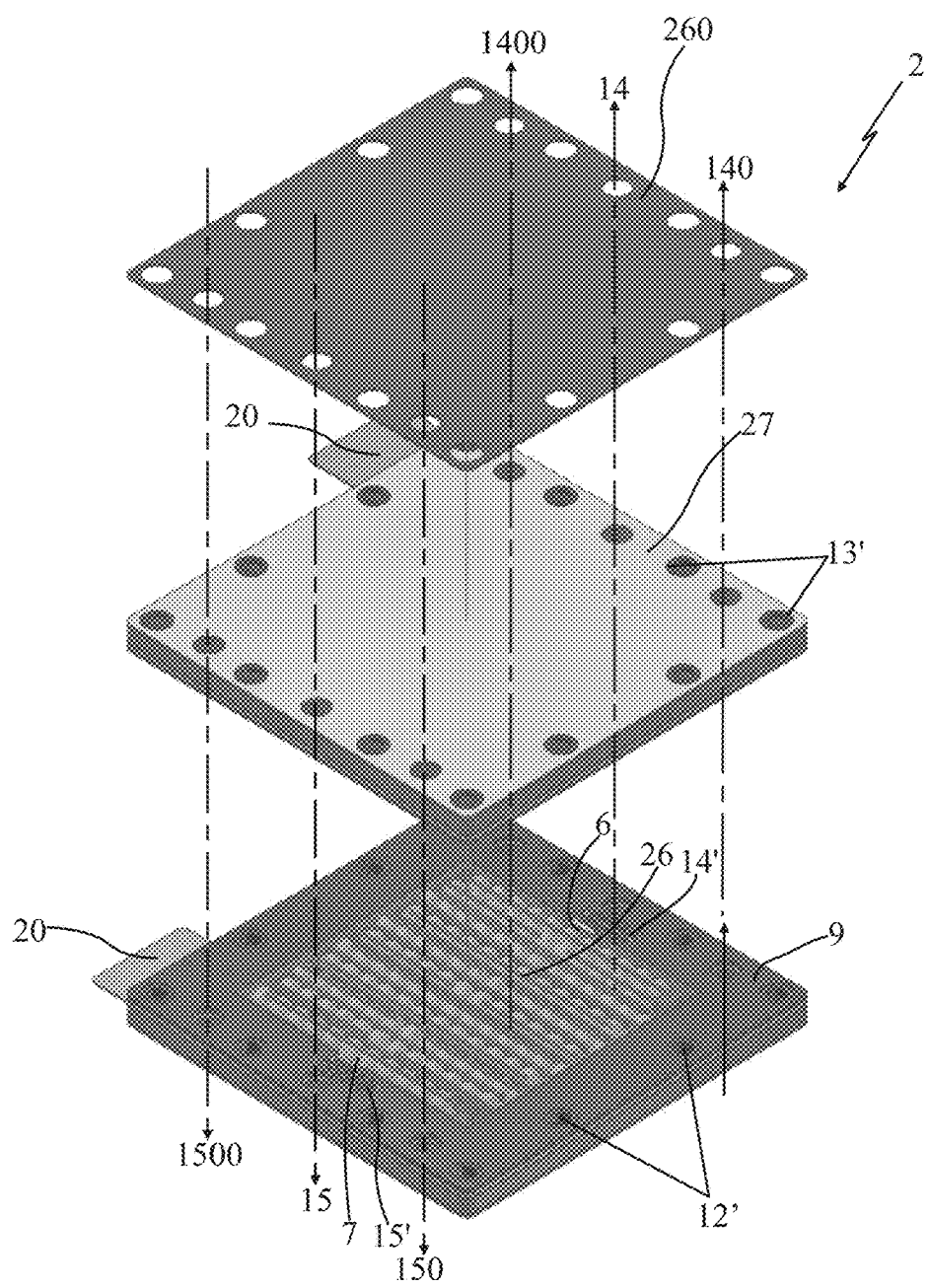
FIG. 19 schematically shows the cell with flow-through capacitors of the apparatus of FIG. 17A, in a partially exploded view.
Figures 23, 24:
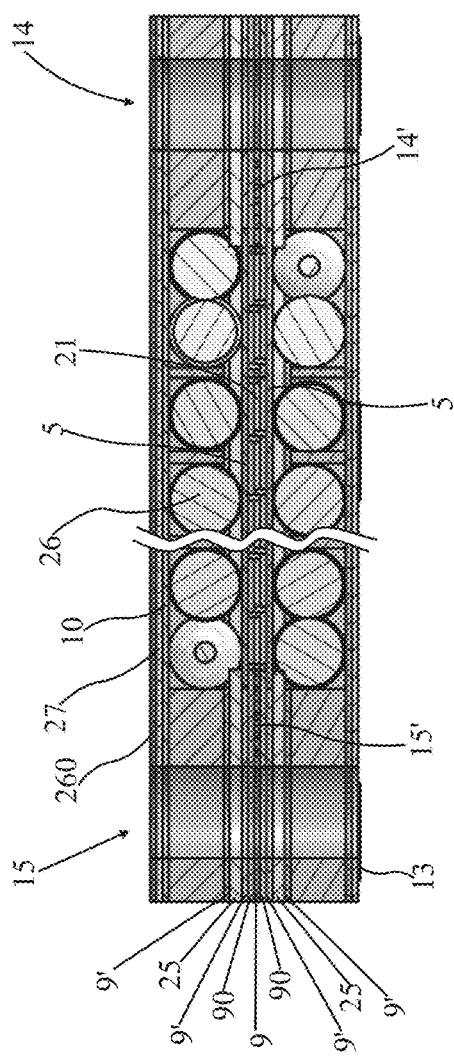
FIG. 23 schematically shows a section view made along the line of the cell of FIG. 20 in which the thicknesses have been increased with respect to the other dimensions in order to facilitate comprehension.
FIG. 24 schematically shows a section view made along the line XXIV-XXIV of the cell of FIG. 20 in which the thicknesses have been increased with respect to the other dimensions in order to facilitate comprehension.
Figure 25:
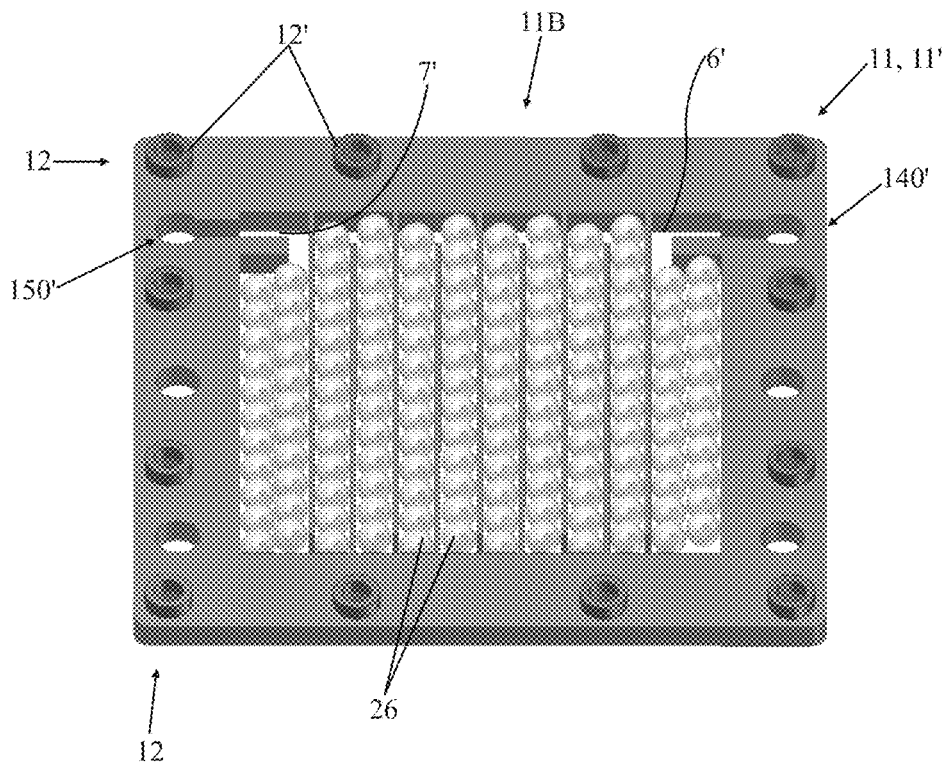
FIGS. 25 and 26 show a detail of the cell of the apparatus of FIG. 17A relative to a support layer.
Figure 26:
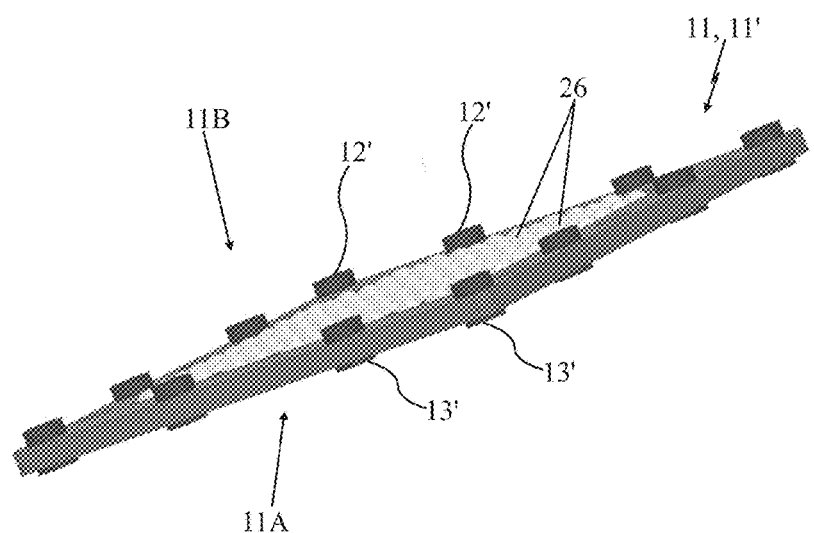

Advantageously, the feed connections 14 and discharge connections 15 of the operating chamber 4 comprise channels 14', 15' obtained in the seal in relief 9 which is interposed with perimeter seal between the two second containment layers 5 (membranes or septa) as schematically indicated in FIG. 18A (the channels 14', 15' are obtained in the seal 9, as already better illustrated in an analogous manner in FIG. 3).

The channels 140', 150' and 1400', 1500" of the respective feed connections 140, 1400 and discharge connections 150, 1500 of the operating chamber 4 for communicating with the cleaning chambers 4', 4" are in turn advantageously obtained, in accordance with a possible embodiment illustrated in the enclosed figures, in the thickness of the support layers 11, 11'.

The operating chambers 4 and the cleaning chambers 4', 4" of contiguous cells 2 are in communication with each other by means of holes generically indicated for all the ducts with the reference numbers 14", 15" obtained in the layers that separate the same chambers.

Therefore, the sealing means interposed between the cells 2, i.e. also the layers that externally cover the central operating chambers 4, will be compressed, packed together by the action exerted by the fixing means 3, such action nevertheless being limited by the compressibility of the sealing means 16 i.e. also by the compressibility of the aforesaid cover layers (e.g. reinforcement layer 27) that externally cover the cells 2, within the second compression end stop distance D2 that separates the support layers 11 or 11' from those of a contiguous cell. The further compression force exerted by the fixing means 3 is in fact counter-balanced by the reaction of the second spacer means 13 of the contiguous treatment cells 2 which are in abutment against each other, preventing the approaching of the treatment cells 2 (and hence their further compression) beyond the distance D2.

The first spacer means 12 interposed between the opposite internal faces 11B, 11'B of the two support layers 11, 11' contain, within a first compression end stop distance D1, all the layers interposed therebetween that form the central operating chamber 4 and the two cleaning chambers 4', 4" and hence limit their maximum compression so as to optimize the operation of the same chambers 4, 4', 4".

The apparatus thus conceived therefore attains the pre-established objects.

Of course, in the practical achievement thereof, it can also assume forms and configurations that are different from that illustrated above, without departing from the present protective scope. In addition, all details can be substituted by technically equivalent elements and the size, shape and materials used can be of any type according to requirements.

The invention claimed is:

1. An apparatus for treating a fluid, comprising:
   a plurality of treatment cells which are superimposed to form a stack;
   fixing means which mechanically compress said treatment cells against each other;
   wherein each said treatment cell comprises one or more chambers, each of which is delimited by at least two containment layers that are substantially facing, is provided with at least one inlet opening and with at least one outlet opening for the passage of at least one fluid and is perimetrically closed by first sealing means arranged for sealing the chamber with fluid seal;
   a plurality of electrode layers placed to intercept said fluid inside at least one of said one or more chambers of each said treatment cell;
   wherein each said treatment cell comprises at least two support layers, each of which is mechanically associated with one of two containment layers of one of said one or more chambers;
   wherein first spacer means are interposed between the two support layers of each said treatment cell, and separate, by a first compression end stop distance (D1), said two support layers of said chamber mechanically associated with said two containment layers;
   wherein second spacer means are interposed between the support layers of two contiguous treatment cells compressed by said fixing means in abutment against each other, and separate said support layers by a second compression end stop distance (D2).

2. The apparatus of claim 1, wherein the compression of said fixing means are configured to exert, on the stack of treatment cells, a compression which is limited, on layers that are interposed between the support layers of contiguous treatment cells, by abutment of said second spacer means.

3. The apparatus of claim 1, wherein said fixing means are configured to exert, on the stack of treatment cells, a compression which is limited, on the first sealing means which are interposed between said two containment layers mechanically associated with said support layers of a same chamber, by abutment of said first spacer means.

4. The apparatus of claim 1, wherein the inlet openings and the outlet openings of chambers of contiguous treatment cells are respectively connected to each other by means of feed connections and discharge connections with interposition of respective second sealing means and third sealing means,
   wherein the second sealing means and the third sealing means are subjected to a compression by said fixing means, the compression being limited by abutment of said second spacer means.

5. The apparatus of claim 1, wherein the fluid contained in said apparatus is substantially equal to a liquid contained in the chambers of said treatment cells.

6. The apparatus of claim 1, wherein at least containment layer of each treatment cell is obtained with an electrode layer.

7. The apparatus of claim 1, wherein at least one support layer of said treatment cell:
   has a through window;
   has and external face, on which the containment layer is fixed to close said window;
   has an internal face, on which a seal layer of said first sealing means is fixed.

8. The apparatus of claim 7, wherein said electrode layer comprises:
   at least one current distribution layer fixed to said support layer;
   at least one porous conductor layer placed at least on the window of said support layer;
   at least one layer of semi-permeable ion exchange material, placed at least on said porous conductor layer.

9. The apparatus of claim 1, further comprising at least one spacer layer interposed between said containment layers.

10. The apparatus of claim 1, wherein each said treatment cell comprises:
    a central cleaning chamber traversed by a cleaning fluid,
    two lateral operating chambers traversed by a fluid to be purified, wherein said central cleaning chamber is interposed between said two lateral operating chambers;
    wherein each of said operating chambers is respectively delimited by a first containment layer and by a second containment layer,
    wherein said first containment layers arranged more externally with respect to said second containment layers,
    wherein said second containment layers delimit said cleaning chamber;
    wherein each of said first containment layers is obtained with an electrode layer;
    wherein said second containment layers are substantially impermeable to the fluid to be treated and to the cleaning fluid and are susceptible of being selectively traversed, towards said cleaning chamber, by ions that are contained in the fluid to be treated flowing in said operating chambers, and are under action of an electric field generated by said electrodes.

11. The apparatus of claim 10, wherein the inlet openings and the outlet openings of chambers of contiguous treatment cells are respectively connected to each other by means of feed connections and discharge connections with interposition of respective second sealing means and third sealing means,
    wherein said fixing means are configured to exert, on the stack of treatment cells, a compression which is limited, on the two operating chambers of two contiguous cells in the stack and on said second scaling means and third scaling means, by abutment between said second spacer means interposed between the support layers of two contiguous treatment cells in the stack.

12. The apparatus of claim 1, wherein each said treatment cell comprises:
    a central operating chamber versed by a fluid to be purified,
    a second lateral cleaning chamber and a third lateral cleaning chamber respectively traversed by a first operative slurry and by a second operative slurry which contain, respectively, first and second corpuscles susceptible of being electrostatically charged;
    wherein said central operating chamber is interposed between said second lateral cleaning chamber and said third lateral cleaning chamber;
    wherein each of said second lateral cleaning chamber and said third lateral cleaning chamber is delimited, towards the exterior of the treatment cell, by a first containment layer formed by the electrode layer, and is delimited, towards the interior of said treatment cell, by a second containment layer formed by a septum;
    wherein the septa of said lateral second and third cleaning chambers delimit said central operating chamber and are respectively permeable to at least anionic particles and to at least cationic particles susceptible of being forced by action of an electric field produced by said electrode layers, so that the anionic particles and the cationic particles pass from fluid to be treated, contained in said central operating chamber, respectively into the first slurry and into the second slurry.

13. The apparatus of claim 12, wherein said fixing means are configured to exert, on the stack of treatment cells, a compression which is limited, on the lateral second and third cleaning chambers and on the central operating chamber of each treatment cell, by abutment between said first spacer means interposed between the support layers of each treatment cell.

14. The apparatus of claim 1, further comprising electronic control means for controlling power supply of the treatment cells, wherein said electronic control means are mechanically fixed to at least one of the support layers and are electrically connected to the electrode layers of said treatment cell.

15. The apparatus of claim 14, wherein said electronic control means are housed in an opening, which is obtained in said support layer and is closed inside said treatment cell.

16. The apparatus of claim 15, wherein said electronic control means comprise at least one board fixed to the support layer and housed in a through opening of said support layer;
wherein said board is electrically connected:
to an electrical power supply source by means of two terminals, which are at least partially extended projectingly from said board and reach an externally accessible area of said module;
to each of the electrode layers by means of pairs of tabs.

17. The apparatus of claim 14, wherein said treatment cells are assembled together in groups of cells forming base modules mechanically and hydraulically connectable in succession with each other ill order to obtain said apparatus;
wherein each said base module is provided with said electronic control means fixed to the support layer of at least one treatment cell of said module;
wherein said electronic means are electrically connected to the electrode layers of the treatment cells which form said module, for controlling the power supply of such cells.

* * * * *